United States Patent
Takeda et al.

(10) Patent No.: US 8,780,302 B2
(45) Date of Patent: Jul. 15, 2014

(54) LIQUID CRYSTAL DISPLAY DEVICE

(71) Applicant: Japan Display Inc., Tokyo (JP)

(72) Inventors: Arihiro Takeda, Saitama (JP); Tomoko Kozuka, Maebashi (JP); Jin Hirosawa, Satima (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/070,969

(22) Filed: Nov. 4, 2013

(65) Prior Publication Data

US 2014/0063391 A1    Mar. 6, 2014

Related U.S. Application Data

(62) Division of application No. 13/469,458, filed on May 11, 2012, now Pat. No. 8,605,244.

(30) Foreign Application Priority Data

Aug. 8, 2011 (JP) ................................. 2011-172849

(51) Int. Cl.
*G02F 1/1335* (2006.01)

(52) U.S. Cl.
USPC ............................ 349/106; 349/142; 349/143

(58) Field of Classification Search
USPC .................. 349/106–108, 142–143
See application file for complete search history.

(56) References Cited

U.S. PATENT DOCUMENTS

| | | | |
|---|---|---|---|
| 6,266,116 B1 | 7/2001 | Ohta et al. | |
| 7,495,724 B2 | 2/2009 | Yoshida et al. | |
| 7,499,134 B2 | 3/2009 | Yamada et al. | |
| 7,688,416 B2 | 3/2010 | Fukuoka et al. | |
| 7,742,135 B2 | 6/2010 | Tago et al. | |
| 7,924,393 B2 | 4/2011 | Fukuoka et al. | |
| 8,228,474 B2 | 7/2012 | Imakawa et al. | |
| 8,355,104 B2 | 1/2013 | Yoshida et al. | |
| 2001/0010575 A1 | 8/2001 | Yoshida et al. | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2007/0200990 A1 | 8/2007 | Hirosawa et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |

(Continued)

FOREIGN PATENT DOCUMENTS

| | | |
|---|---|---|
| JP | 6-222397 | 8/1994 |
| JP | 7-159807 | 6/1995 |

(Continued)

OTHER PUBLICATIONS

U.S. Appl. No. 14/048,552, filed Oct. 8, 2013, Hirosawa, et al.

*Primary Examiner* — Phu Vu
(74) *Attorney, Agent, or Firm* — Oblon, Spivak, McClelland, Maier & Neustadt, L.L.P.

(57) ABSTRACT

According to one embodiment, a liquid crystal display device includes a main pixel electrode which extends in a second direction, a sub-pixel electrode which extends in a first direction and crosses the main pixel electrode, a color filter which includes a first aperture portion defined by a first edge surrounding a position opposed to cross points between the main pixel electrode and the sub-pixel electrode, main common electrodes which extend in the second direction on both sides of the main pixel electrode.

20 Claims, 10 Drawing Sheets

(56) References Cited

U.S. PATENT DOCUMENTS

| | | |
|---|---|---|
| 2008/0192160 A1 | 8/2008 | Yoshida et al. |
| 2011/0075083 A1 | 3/2011 | Takeda et al. |
| 2012/0099070 A1 | 4/2012 | Hirosawa et al. |
| 2012/0182501 A1 | 7/2012 | Fukuoka et al. |
| 2012/0182509 A1 | 7/2012 | Takano et al. |
| 2012/0236239 A1 | 9/2012 | Morita et al. |
| 2012/0249930 A1 | 10/2012 | Takano et al. |
| 2012/0268705 A1 | 10/2012 | Hasegawa et al. |
| 2012/0293752 A1 | 11/2012 | Takeda et al. |
| 2013/0010235 A1 | 1/2013 | Hirosawa et al. |
| 2013/0010237 A1 | 1/2013 | Fujiyama et al. |
| 2013/0033661 A1 | 2/2013 | Kozuka et al. |
| 2013/0050601 A1 | 2/2013 | Takeda et al. |
| 2013/0070191 A1 | 3/2013 | Hirosawa |
| 2013/0077010 A1 | 3/2013 | Takeda et al. |
| 2013/0314635 A1 | 11/2013 | Takeda et al. |

FOREIGN PATENT DOCUMENTS

| | | |
|---|---|---|
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |
| JP | 2009-192822 | 8/2009 |

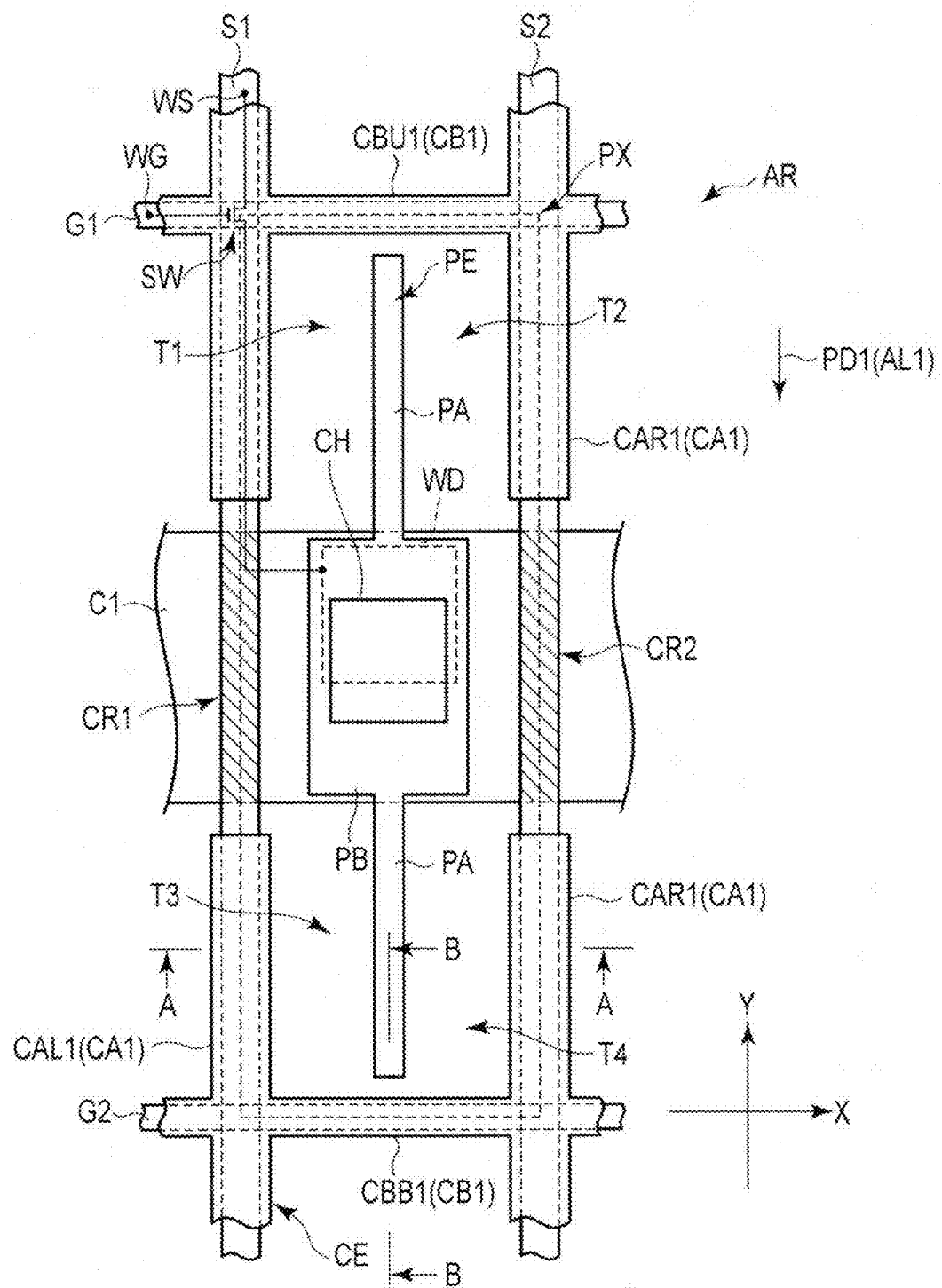
F I G. 2

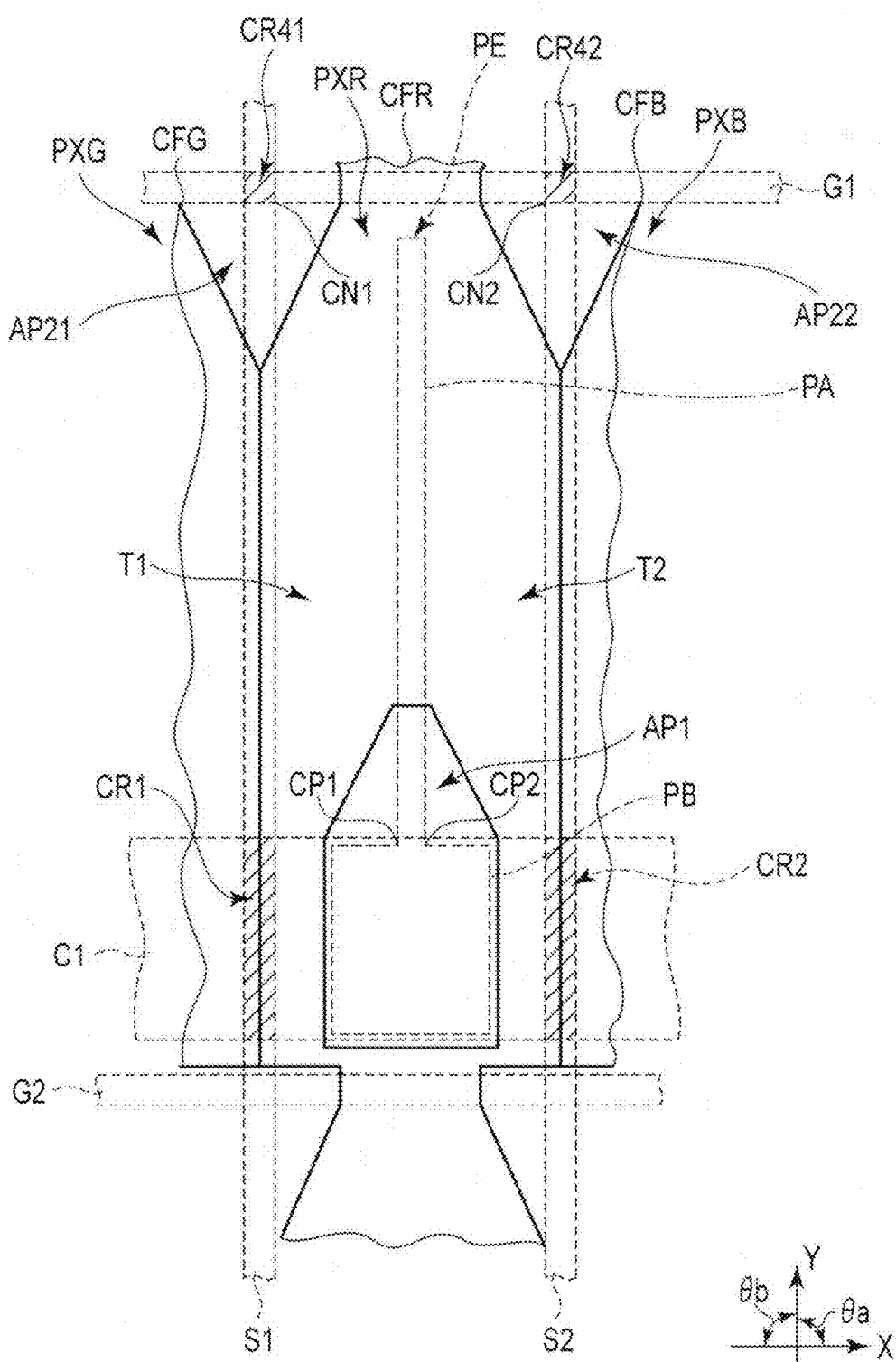
F I G. 10

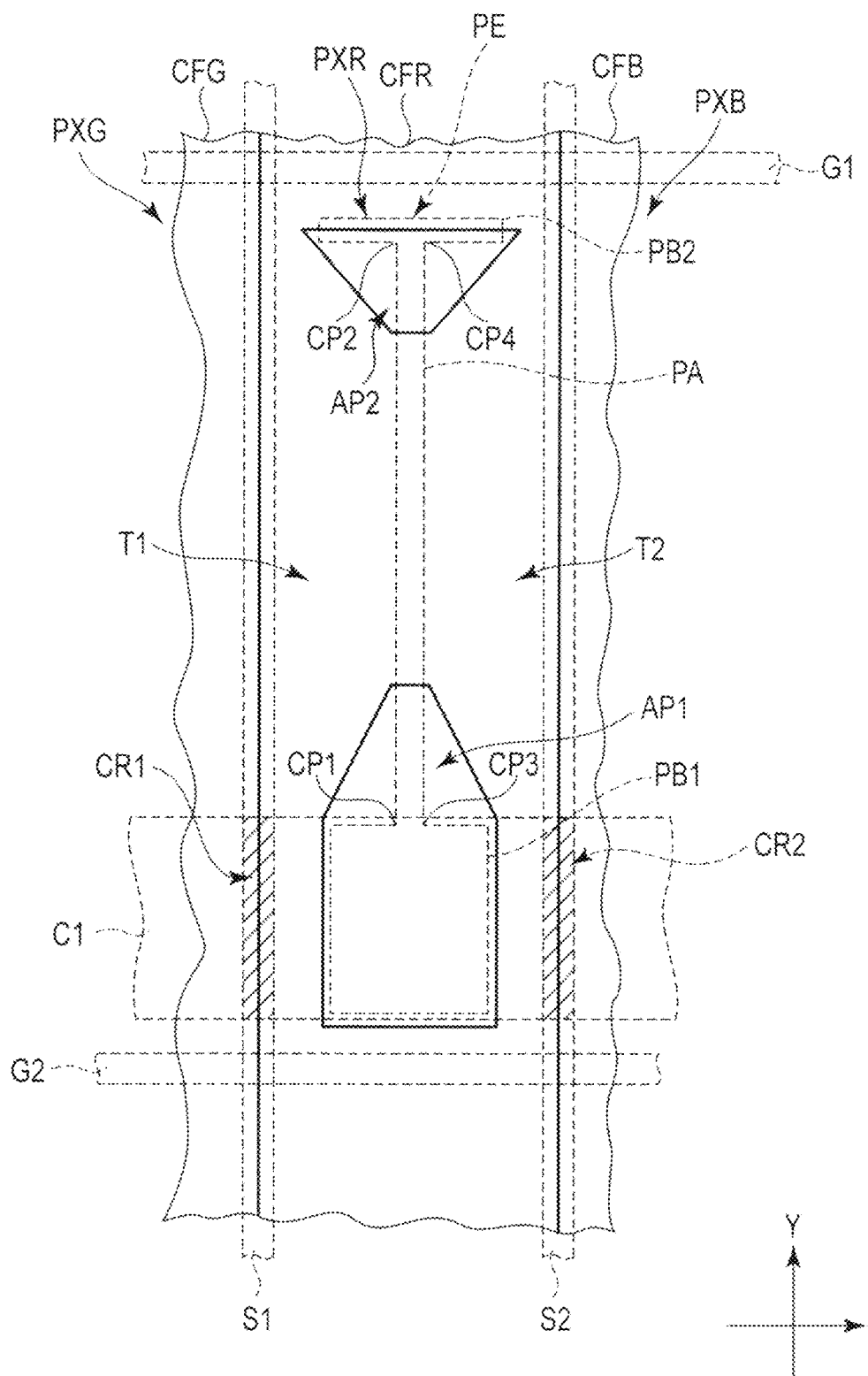
F I G. 11

LIQUID CRYSTAL DISPLAY DEVICE

CROSS-REFERENCE TO RELATED APPLICATIONS

This application is a divisional of U.S. application Ser. No. 13/469,458 filed May 11, 2012, and is based upon and claims the benefit of priority from prior Japanese Patent Application No. 2011-172849, filed Aug. 8, 2011, the entire contents of each of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 2 is a plan view which schematically shows a structure example of a pixel at a time when an array substrate shown in FIG. 1 is viewed from a counter-substrate side.

FIG. 10 is a plan view which schematically shows another shape of the color filter in the embodiment.

FIG. 11 is a plan view which schematically shows another shape of the color filter in the embodiment.

DETAILED DESCRIPTION

Figure 1:
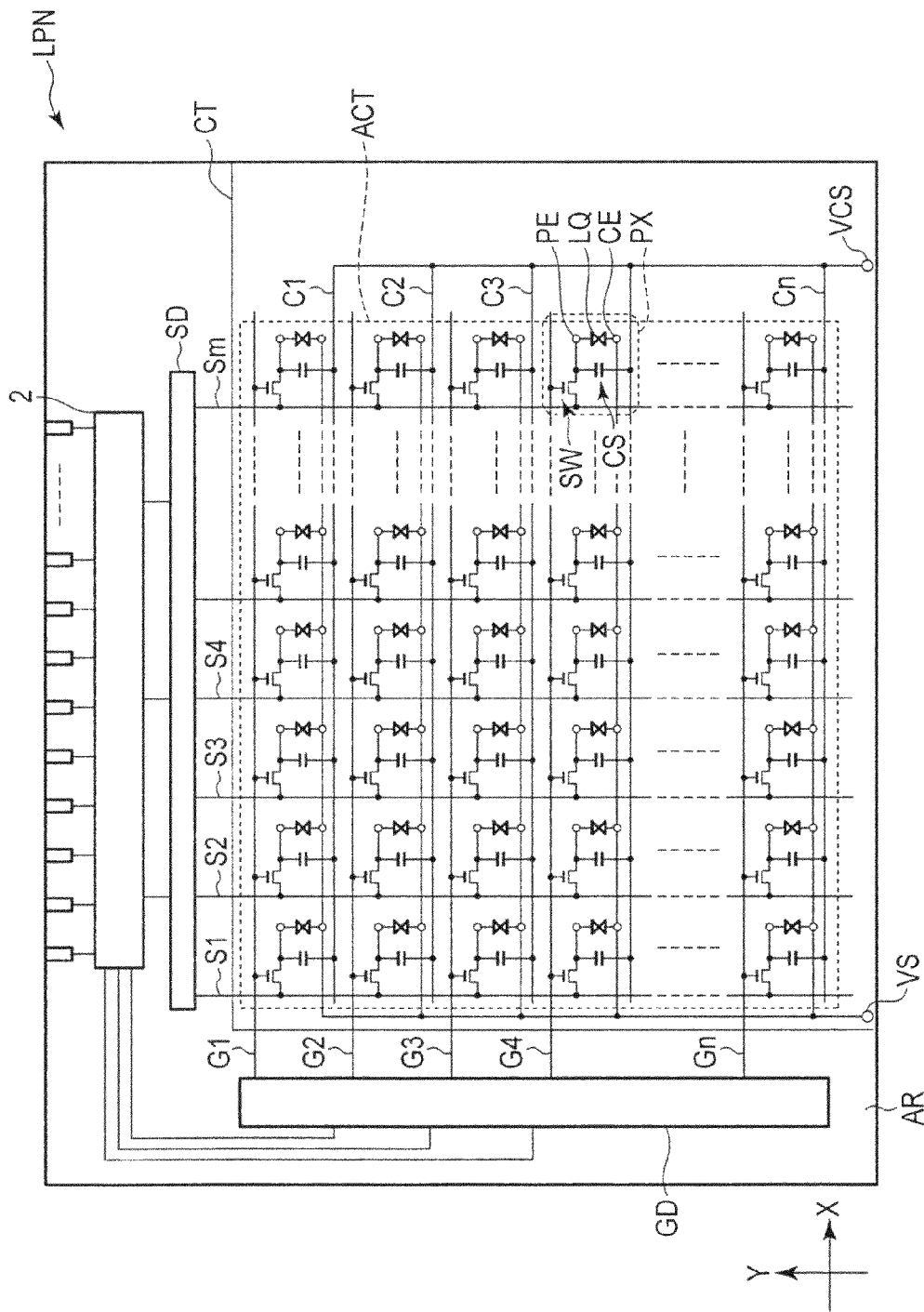
FIG. 1 is a view which schematically illustrates a structure and an equivalent circuit of a liquid crystal display device according to an embodiment.

In general, according to one embodiment, a liquid crystal display device includes: a first substrate including a first gate line and a second gate line which extend in a first direction, a storage capacitance line which extends in the first direction between the first gate line and the second gate line, a first source line and a second source line which extend in a second direction crossing the first direction, a switching element which is electrically connected to the first gate line and the first source line, a main pixel electrode which extends in the second direction between the first source line and the second source line, a sub-pixel electrode which extends in the first direction, is electrically connected to the switching element, crosses the main pixel electrode and is continuous with the main pixel electrode, and a first alignment film which covers the main pixel electrode and the sub-pixel electrode; a second substrate including a color filter which includes a first aperture portion defined by a first edge surrounding a position opposed to cross points between the main pixel electrode and the sub-pixel electrode, an overcoat layer which covers the color filter and extends over the first aperture portion, main common electrodes which extend in the second direction on both sides of the main pixel electrode on that side of the overcoat layer, which is opposed to the first substrate, and a second alignment film which covers the main common electrodes; and a liquid crystal layer including liquid crystal molecules held between the first substrate and the second substrate.

According to one embodiment, a liquid crystal display device includes: a first substrate including a first gate line and a second gate line which extend in a first direction, a storage capacitance line which extends in the first direction at a substantially middle point between the first gate line and the second gate line, a first source line and a second source line which extend in a second direction crossing the first direction, a switching element which is electrically connected to the first gate line and the first source line, a cross-shaped pixel electrode including a main pixel electrode, which extends in the second direction between the first source line and the second source line, and a sub-pixel electrode, which is located above the storage capacitance line, is electrically connected to the switching element, crosses the main pixel electrode and extends in the first direction, and a first alignment film which covers the pixel electrode; a second substrate including a color filter which includes a first aperture portion defined by a first edge surrounding a position opposed to first to fourth cross points between the main pixel electrode and the sub-pixel electrode at a central part of the pixel, an overcoat layer which covers the color filter and extends over the first aperture portion, main common electrodes which extend in the second direction on both sides of the main pixel electrode on that side of the overcoat layer, which is opposed to the first substrate, and a second alignment film which covers the main common electrodes; and a liquid crystal layer including liquid crystal molecules held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is disposed between the array substrate AR and the counter-substrate CT. The liquid crystal display panel LPN includes an active area ACT which displays an image. The active area ACT is composed of a plurality of pixels PX which are arrayed in a matrix of m×n (m and n are positive integers).

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C correspond to signal lines extending substantially linearly, for example, in a first direction X. The gate lines G and storage capacitance lines C neighbor at intervals along a second direction Y crossing the first direction X, and are alternately arranged in parallel. In this example, the first direction X and the second direction Y are perpendicular to each other. The source lines S cross the gate lines G and storage capacitance lines C. The source lines S correspond to signal lines extending substantially linearly along the second direction Y. It is not always necessary that each of the gate lines G, storage capacitance lines C and source lines S extend linearly, and a part thereof may be bent.

Each of the gate lines G is led out to the outside of the active area ACT and is connected to a gate driver GD. Each of the source lines S is led out to the outside of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane which is defined by the first direction X and second direction Y, or to a substrate major surface of the array substrate AR or a substrate major surface of the counter-substrate CT (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE has, for example, a common potential, and is disposed common to the pixel electrodes PE of plural pixels PX via the liquid crystal layer LQ. The pixel electrodes PE and common electrode CE are formed of a light-transmissive, electrically conductive material such as indium tin oxide (ITO) or indium zinc oxide (IZO). However, the pixel electrodes PE and common electrode CE may be formed of other metallic material such as aluminum.

The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS via an electrically conductive member (not shown).

FIG. 2 is a plan view which schematically shows a structure example of one pixel PX at a time when the array substrate AR shown in FIG. 1 is viewed from the counter-substrate side. FIG. 2 is a plan view in an X-Y plane.

The array substrate AR includes a gate line G1, a gate line G2, a storage capacitance line C1, a source line S1, a source line S2, a switching element SW, a pixel electrode PE, and a first alignment film AL1. In the example illustrated, the array substrate AR further includes a part of a common electrode CE.

The gate line G1, gate line G2 and storage capacitance line C1 extend in the first direction X. The source line S1 and source line S2 extend in the second direction Y. The storage capacitance line C1 is located at a substantially middle point between the gate line G1 and the gate line G2. Specifically, the distance between the gate line G1 and the storage capacitance line C1 in the second direction Y is substantially equal to the distance between the gate line G2 and the storage capacitance line C1 in the second direction Y.

In the example illustrated, the pixel PX corresponds to a grid region which is formed by the gate line G1, gate line G2, source line S1 and source line S2, as indicated by a broken line in FIG. 2. The pixel PX has a rectangular shape having a greater length in the second direction Y than in the first direction X. The length of the pixel PX in the first direction X corresponds to a pitch between the source line S1 and source line S2 in the first direction X. The length of the pixel PX in the second direction Y corresponds to a pitch between the gate line G1 and gate line G2 in the second direction Y. The pixel electrode PE is disposed between the source line S1 and source line S2 which neighbor each other. In addition, the pixel electrode PE extends immediately above the storage capacitance line C1 and is located between the gate line G1 and gate line G2.

In the example illustrated, in the pixel PX, the source line S1 is disposed at a left side end portion, the source line S2 is disposed at a right side end portion, the gate line G1 is disposed at an upper side end portion, and the gate line G2 is disposed at a lower side end portion. Strictly speaking, the source line S1 is disposed to extend over a boundary between the pixel PX and a pixel neighboring on the left side, the source line S2 is disposed to extend over a boundary between the pixel PX and a pixel neighboring on the right side, the gate line G1 is disposed to extend over a boundary between the pixel PX and a pixel neighboring on the upper side, and the gate line G2 is disposed to extend over a boundary between the pixel PX and a pixel neighboring on the lower side. The storage capacitance line C1 is disposed at a substantially central part of the pixel PX. A region where the storage capacitance line C1 and the source line S1 cross is a first intersection part CR1, and a region where the storage capacitance line C1 and the source line S2 cross is a second intersection part CR2. The first intersection part CR1 and second intersection part CR2 are regions indicated by hatching lines in FIG. 2.

A switching element SW in the illustrated example is electrically connected to the gate line G1 and source line S1. The switching element SW is provided at an intersection between the gate line G1 and source line S1. A gate electrode WG of the switching element SW is electrically connected to the gate line G1, and a source electrode WS of the switching element SW is electrically connected to the source line S1. A drain electrode WD of the switching element SW is formed to extend along the source line S1 and storage capacitance line C1, and is electrically connected to the pixel electrode PE via a contact hole CH formed in an area overlapping the storage capacitance line C1. The switching element SW is provided in an area overlapping the source line S1 and storage capacitance line C1, and does not substantially protrude from the area overlapping the source line S1 and storage capacitance line C1, thus suppressing a decrease in area of an aperture portion which contributes to display.

The pixel electrode PE includes a main pixel electrode PA and a sub-pixel electrode PB. The main pixel electrode PA and sub-pixel electrode PB are formed to be integral or continuous, and are electrically connected to each other. In the meantime, in the example illustrated, only the pixel electrode PE which is disposed in one pixel PX is shown, but pixel electrodes of the same shape are disposed in other pixels, the depiction of which is omitted.

The main pixel electrode PA linearly extends in the second direction Y, between the source line S1 and source line S2, from the sub-pixel electrode PB to the vicinity of the upper side end portion of the pixel PX and to the vicinity of the lower side end portion of the pixel PX. The main pixel electrode PA is formed in a strip shape having a substantially equal width along the first direction X.

The sub-pixel electrode PB linearly extends in the first direction X from the main pixel electrode PA toward the source line S1 and source line S2. The sub-pixel electrode PB is disposed at a region which is opposed to the storage capacitance line C1, and is electrically connected to the drain electrode WD of the switching element SW via the contact hole CH. The sub-pixel electrode PB is formed in a strip shape along the X direction with a width which is greater than the width of the main pixel electrode PA. The sub-pixel electrode PB is located between the first intersection part CR1 and second intersection part CR2. The sub-pixel electrode PE shown in the Figure crosses an intermediate part of the main pixel electrode PA, and the pixel electrode PE has a cross shape.

The pixel electrode PE is disposed at a substantially middle point between the source line S1 and source line S2, that is, at the center of the pixel PX. The distance in the first direction X between the source line S1 and main pixel electrode PA is substantially equal to the distance in the first direction X between the source line S2 and the main pixel electrode PA.

The common electrode CE includes first main common electrodes CA1 and first sub-common electrodes CB1 on the array substrate AR. The first main common electrodes CA1 and first sub-common electrodes CB1 are formed to be integral or continuous with each other, and are electrically to each other. Specifically, the first main common electrodes CA1 and first sub-common electrodes CB1 are disposed in a manner to surround the pixel electrode PE, and are spaced a part from the pixel electrode PE.

The first main common electrodes CA1 extend, in the X-Y plane, linearly in the second direction Y that is substantially parallel to the main pixel electrode PA, on both sides of the main pixel electrode PA. Alternatively, the first main common electrodes CA1 are opposed to the source lines S and extend substantially in parallel to the main pixel electrode PA. The first main common electrode CA1 is formed in a strip shape having a substantially equal width in the first direction X. In addition, the first main common electrodes CA1 are broken at positions on both sides of the sub-pixel electrode PB. Specifically, the first main common electrodes CA1 are broken at the first intersection part CR1 and second intersection part CR2.

In the example illustrated, two first main common electrodes CA1 are arranged in parallel with a distance in the first direction X, and are located at left and right end portions of the pixel PX, respectively. In the description below, in order to distinguish these first main common electrodes CA1, the first main common electrode located on the left side of the pixel PX is referred to as "CAL1", and the first main common electrode located on the right side is referred to as "CAR1". Strictly speaking, the first main common electrode CAL1 is disposed to extend over a boundary between the pixel PX and a pixel neighboring on the left side, and the first main common electrode CAR1 is disposed to extend over a boundary between the pixel PX and a pixel neighboring on the right side. The first main common electrode CAL1 is broken at the intersection part CR1 and is opposed to the source line S1 at the other positions. The first main common electrode CAR1 is broken at the intersection part CR2 and is opposed to the source line S2 at the other positions.

The first sub-common electrodes CB1 extend, in the X-Y plane, linearly in the first direction X that is substantially parallel to the sub-pixel electrode PB, on both sides of the sub-pixel electrode PB. Alternatively, the first sub-common electrodes CB1 are opposed to the gate lines G and extend substantially in parallel to the sub-pixel electrode PB. The first sub-common electrode CB1 is formed in a strip shape. The width in the second direction Y of the first sub-common electrode CB1 may not necessarily be uniform. In addition, the first sub-common electrodes CB1 are formed integral or continuous with the first main common electrodes CA1, and are electrically connected to the first main common electrodes CA1. Specifically, the first sub-common electrodes CB1 have the same potential as the first main common electrodes CA1.

In the example illustrated, two first sub-common electrodes CB1 are arranged in parallel with a distance in the second direction Y, and are disposed at upper and lower end portions of the pixel PX, respectively. In the description below, in order to distinguish these first sub-common electrodes CB1, the first sub-common electrode located on the upper side of the pixel PX is referred to as "CBU1", and the first sub-common electrode located on the lower side of the pixel PX is referred to as "CBB1". Strictly speaking, the first sub-common electrode CBU1 is disposed to extend over a boundary between the pixel PX and a pixel neighboring on the upper side, and the first sub-common electrode CBB1 is disposed to extend over a boundary between the pixel PX and a pixel neighboring on the lower side. The first sub-common electrode CBU1 is opposed to the gate line G1, without being broken at an intermediate part thereof. The first sub-common electrode CBB1 is opposed to the gate line G2, without being broken at an intermediate part thereof.

Paying attention to the positional relationship between the pixel electrode PE and the common electrode CE, the following relationship is established.

In the X-Y plane, the main pixel electrode PA and the first main common electrodes CA1 are alternately arranged along the first direction X. The main pixel electrode PA and the first main common electrodes CA1 are arranged substantially parallel to each other. In this case, in the X-Y plane, neither of the first main common electrodes CA1 overlaps the pixel electrode PE. Specifically, one main pixel electrode PA is located between the first main common electrode CAL1 and first main common electrode CAR1 which neighbor each other with a distance in the first direction X. In other words, the first main common electrode CAL1 and first main common electrode CAR1 are disposed on both sides of the main pixel electrode PA. Thus, the first main common electrode CAL1, main pixel electrode PA and first main common electrode CAR1 are arranged in the named order along the first direction X. The distance in the first direction X between the main pixel electrode PA and each of the first main common electrodes CA1 is substantially uniform. Specifically, the distance in the first direction X between the first main common electrode CAL1 and the main pixel electrode PA is substantially equal to the distance in the first direction X between the first main common electrode CAR1 and the main pixel electrode PA.

In the X-Y plane, the sub-pixel electrode PB and the first sub-common electrodes CB1 are alternately arranged along the second direction Y. The sub-pixel electrode PB and the first sub-common electrodes CB1 are arranged substantially parallel to each other. In this case, in the X-Y plane, neither of the first sub-common electrodes CB1 overlaps the pixel electrode PE. Specifically, one sub-pixel electrode PB is located between the first sub-common electrode CBU1 and first sub-common electrode CBB1 which neighbor each other with a distance in the second direction Y. In other words, the first sub-common electrode CBU1 and first sub-common electrode CBB1 are disposed on both sides of the sub-pixel electrode PB. Thus, the first sub-common electrode CBB1, sub-pixel electrode PB and first sub-common electrode CBU1 are arranged in the named order along the second direction Y. The pixel electrode PE, first main common electrodes CA1 and first sub-common electrodes CB1, which are shown in FIG. 2, are covered with the first alignment film AL1.

Figure 3:
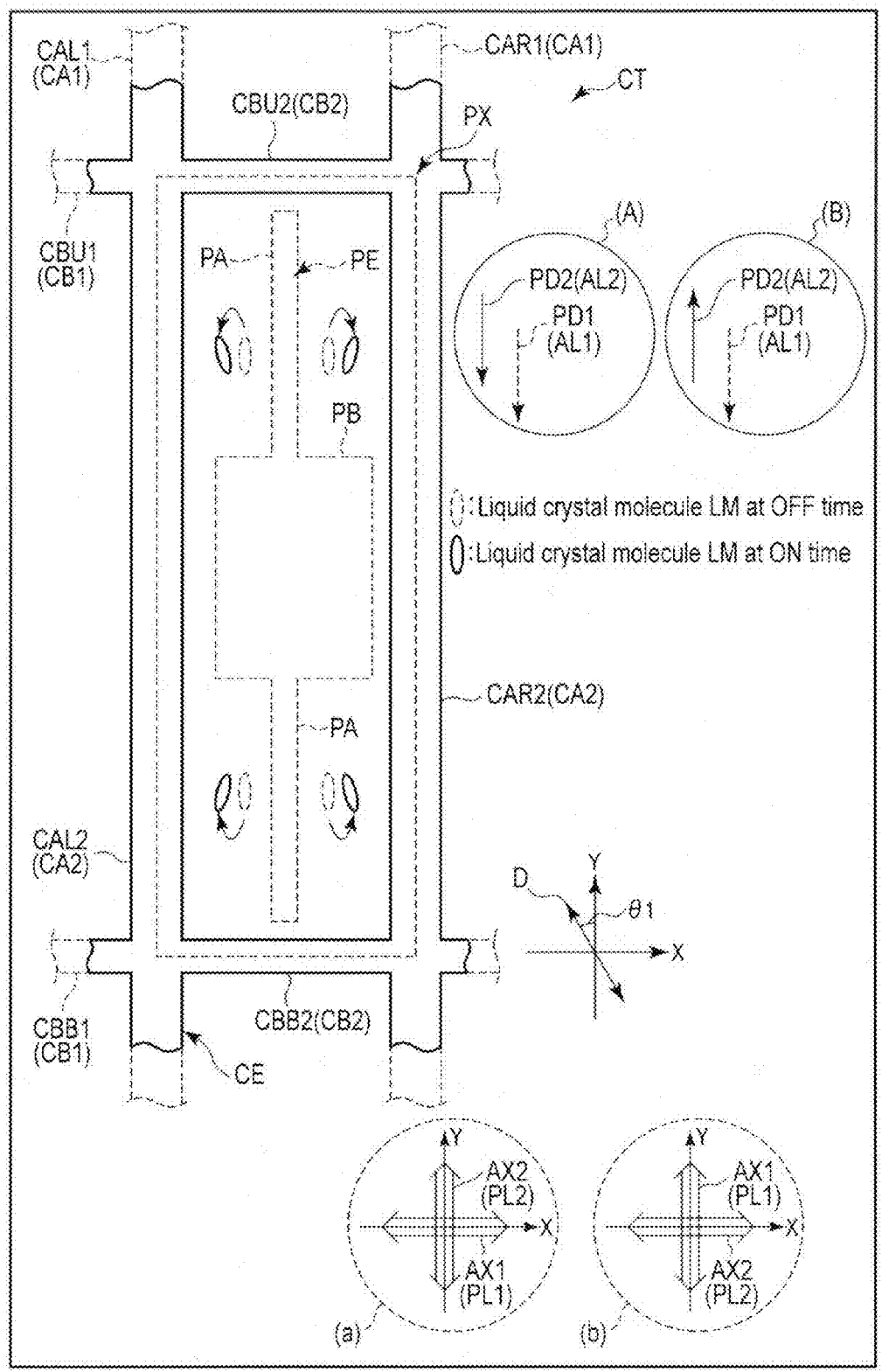
FIG. 3 is a plan view which schematically shows a structure example of a pixel in the counter-substrate shown in FIG. 1.

FIG. 3 is a plan view which schematically shows a structure example of one pixel PX in the counter-substrate CT shown in FIG. 1. FIG. 3 is a plan view in the X-Y plane. FIG. 3 shows only parts which are necessary for the description, and indicates, by broken lines, the pixel electrode PE, first main common electrodes CA1 and first sub-common electrodes CB1 which are provided on the array substrate.

The common electrode CE includes second main common electrodes CA2 and second sub-common electrodes CB2 on the counter-substrate CT. The second main common electrodes CA2 and second sub-common electrodes CB2 are electrically connected to the first main common electrodes CA1 and first sub-common electrodes CB1 provided on the array substrate, for example, on the outside of the active area. Specifically, the second main common electrodes CA2 and second sub-common electrodes CB2 have the same potential as the first main common electrodes CA1 and first sub-common electrodes CB1.

The second main common electrodes CA2 extend, in the X-Y plane, linearly in the second direction Y that is substantially parallel to the main pixel electrode PA, on both sides of the main pixel electrode PA. Alternatively, the second main common electrodes CA2 are opposed to the first main common electrodes CA1 and extend substantially in parallel to the main pixel electrode PA. The second main common electrode CA2 is formed in a strip shape having a substantially equal width in the first direction X.

In the example illustrated, two second main common electrodes CA2 are arranged in parallel with a distance in the first direction X, and are located at left and right end portions of the pixel PX, respectively. In the description below, in order to distinguish these second main common electrodes CA2, the second main common electrode located at the left side end portion of the pixel PX is referred to as "CAL2", and the second main common electrode located at the right side end portion of the pixel PX is referred to as "CAR2". Strictly speaking, the second main common electrode CAL2 is disposed to extend over a boundary between the pixel PX and a pixel neighboring on the left side, and the second main common electrode CAR2 is disposed to extend over a boundary between the pixel PX and a pixel neighboring on the right side. The second main common electrode CAL2 is opposed to the first main common electrode CAL1, without being broken at an intermediate portion thereof. The second main common electrode CAR2 is opposed to the first main common electrode CAR1, without being broken at an intermediate portion thereof.

The second sub-common electrodes CB2 extend, in the X-Y plane, linearly in the first direction X that is substantially parallel to the sub-pixel electrode PB, on both sides of the sub-pixel electrode PB. Alternatively, the second sub-common electrodes CB2 are opposed to the first sub-common electrodes CB1 and extend substantially in parallel to the sub-pixel electrode PB. The second sub-common electrode CB2 is formed in a strip shape having a substantially equal width in the second direction Y. In addition, the second sub-common electrodes CB2 are formed integral or continuous with the second main common electrodes CA2, and are electrically connected to the second main common electrodes CA2. Specifically, in the counter-substrate CT, the common electrode CE is formed in a grid shape.

In the example illustrated, two second sub-common electrodes CB2 are arranged in parallel with a distance in the second direction Y, and are disposed at upper and lower end portions of the pixel PX, respectively. In the description below, in order to distinguish these second sub-common electrodes CB2, the second sub-common electrode located at the upper end portion of the pixel PX is referred to as "CBU2", and the second sub-common electrode located at the lower end portion of the pixel PX is referred to as "CBB2". Strictly speaking, the second sub-common electrode CBU2 is disposed to extend over a boundary between the pixel PX and a pixel neighboring on the upper side, and the second sub-common electrode CBB2 is disposed to extend over a boundary between the pixel PX and a pixel neighboring on the lower side. The second sub-common electrode CBU2 is opposed to the first sub-common electrode CBU1, without being broken at an intermediate part thereof. The second sub-common electrode CBB2 is opposed to the first sub-common electrode CBB1, without being broken at an intermediate part thereof. Each of the second main common electrodes CA2 and second sub-common electrodes CB2, which are shown in FIG. 3, is covered with a second alignment film AL2.

Figure 4:
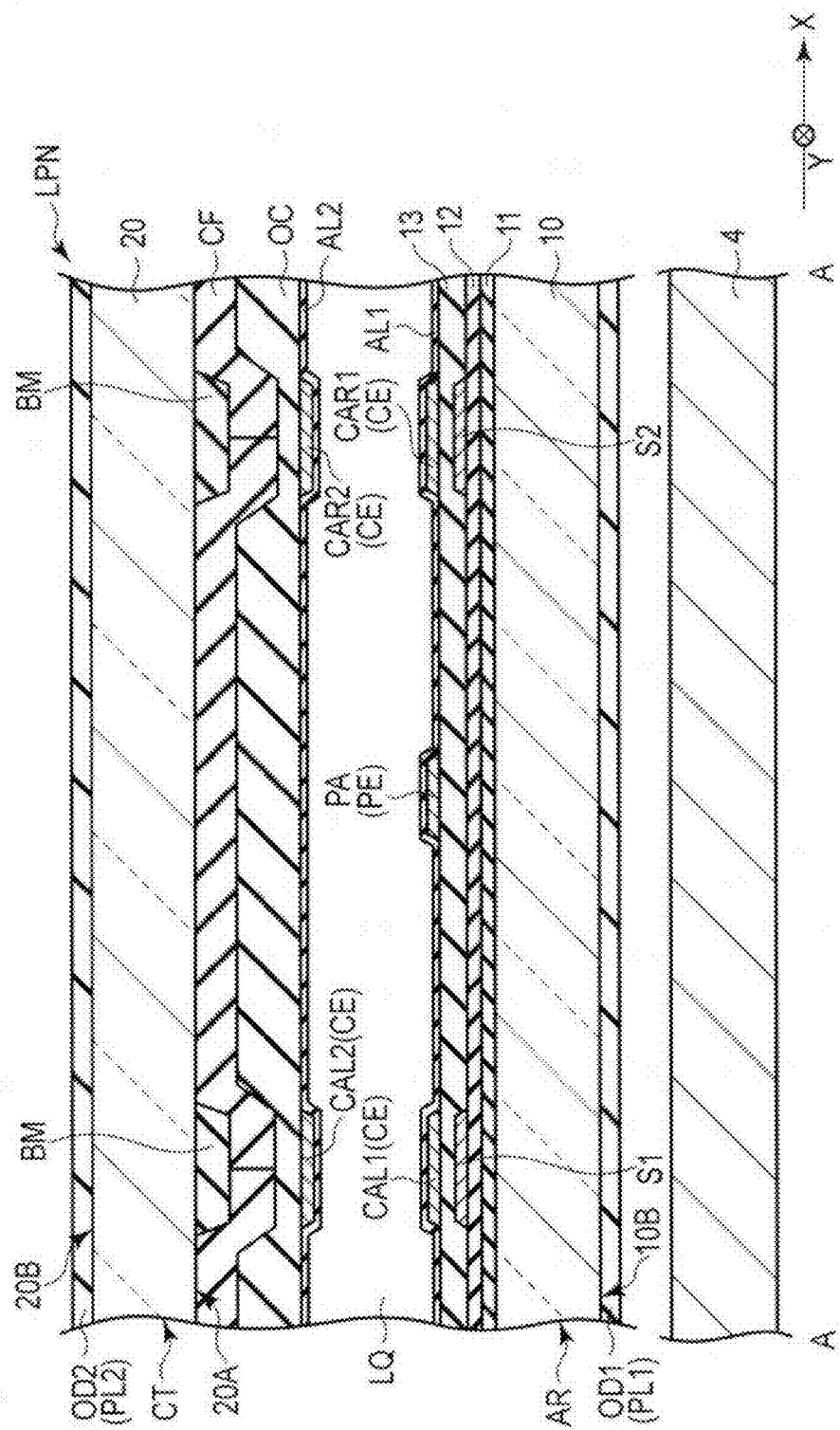
FIG. 4 is a schematic cross-sectional view, taken along line A-A in FIG. 2, showing a cross-sectional structure of a liquid crystal display panel shown in FIG. 2.
Figure 5:
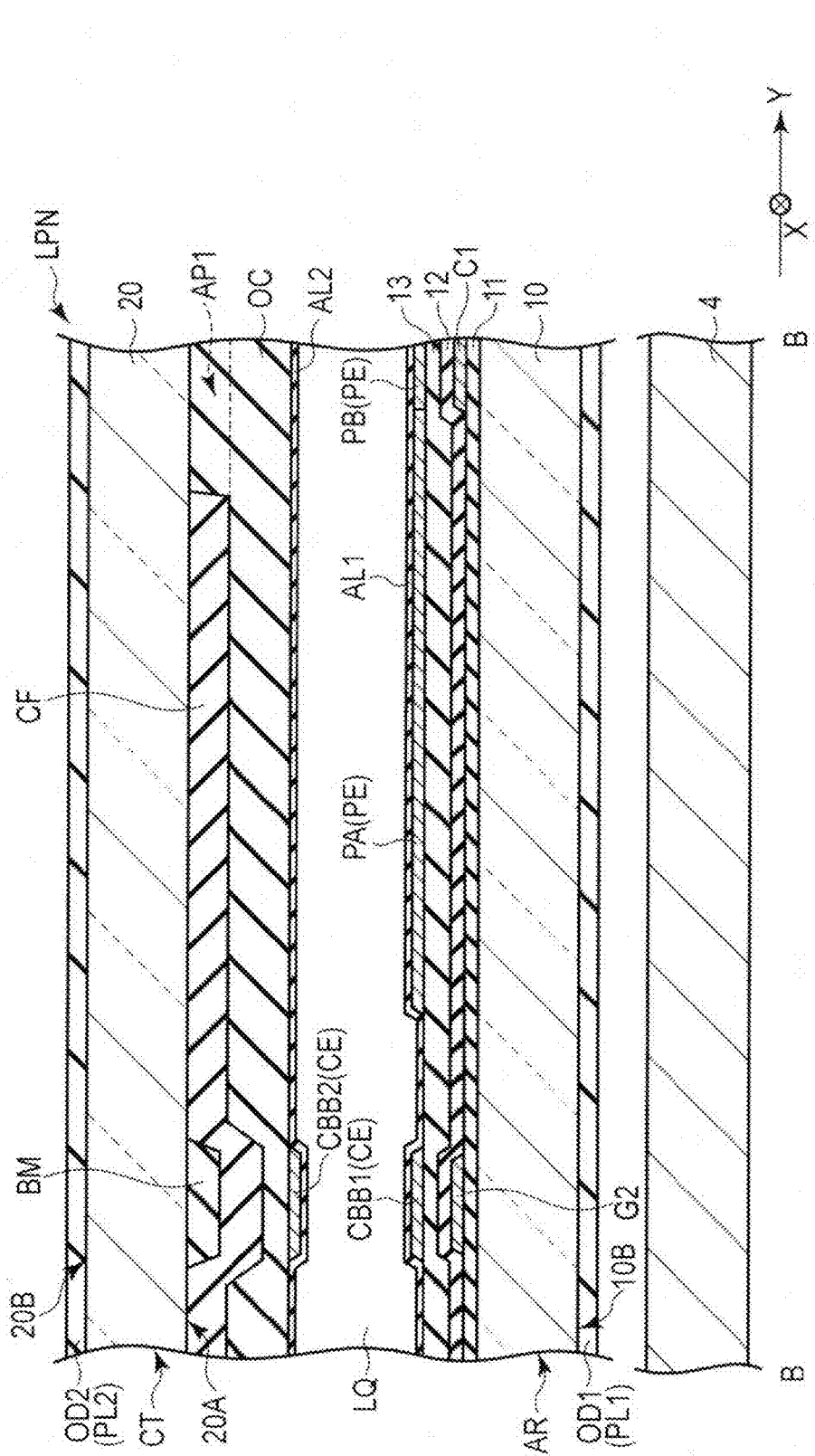
FIG. 5 is a schematic cross-sectional view, taken along line B-B in FIG. 2, showing a cross-sectional structure of the liquid crystal display panel shown in FIG. 2.

FIG. 4 is a schematic cross-sectional view, taken along line A-A in FIG. 2, showing a cross-sectional structure of the liquid crystal display panel LPN shown in FIG. 2. FIG. 5 is a schematic cross-sectional view, taken along line B-B in FIG. 2, showing a cross-sectional structure of the liquid crystal display panel LPN shown in FIG. 2. FIG. 4 and FIG. 5 show only parts which are necessary for the description.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

The array substrate AR is formed by using a first insulative substrate 10 having light transmissivity. The array substrate AR includes, on the inside of the first insulative substrate 10, a gate line G1, a gate line G2, a storage capacitance line C1, a source line S1, a source line S2, a pixel electrode PE, a common electrode CE, a first insulation film 11, a second insulation film 12, a third insulation film 13, and a first alignment film AL1.

The gate line G1, gate line G2 and storage capacitance line C1 are formed on the first insulation film 11, and are covered with the second insulation film 12. The source line S1 and source line S2 are formed on the second insulation film 12 and are covered with the third insulation film 13.

The main pixel electrode PA and sub-pixel electrode PB of the pixel electrode PE, and the first main common electrodes CA1 and first sub-common electrodes CB1 of the common electrode CE are formed on an upper surface of the same insulation film, that is, an upper surface of the third insulation film 13, and are mutually spaced apart. The main pixel electrode PA is located on the inside of a position immediately above each of the neighboring source line S1 and source line S2. The first main common electrode CAL1 is located immediately above the source line S1. The first main common electrode CAR1 is located immediately above the source line S2. The first sub-common electrode CBB1 is located immediately above the gate line G2. The first sub-common electrode CBU1 (not shown) is located immediately above the gate line G1.

A first alignment film AL1 is disposed on that surface of the array substrate AR, which is opposed to the counter-substrate CT. The first alignment film AL1 extends over substantially the entirety of the active area ACT. The first alignment film AL1 covers the pixel electrode PE and common electrode CE, and is also disposed over the third insulation film 13. The first alignment film AL1 is formed of a material which exhibits horizontal alignment properties.

The counter-substrate CT is formed by using a second insulative substrate 20 having light transmissivity. The counter-substrate CT includes a black matrix BM, a color filter CF, an overcoat layer OC, a common electrode CE, and a second alignment film AL2, on the inside of the second insulative substrate 20, that is, on that side of the second insulative substrate 20, which is opposed to the array substrate AR.

The black matrix BM partitions the pixels PX. Specifically, the black matrix BM is disposed so as to be opposed to wiring portions, such as the source lines S, gate lines G, storage capacitance lines C, and switching elements. In the example illustrated, the black matrix BM includes portions which are located above the source line S1 and source line S2 and extend in the second direction Y, and portions which are located above the gate line G2 and gate line G1 (not shown) and extend in the first direction X. The black matrix BM is disposed on an inner surface 20A of the second insulative substrate 20, which is opposed to the array substrate AR.

The color filter CF is disposed in association with each pixel PX. Specifically, the color filter CF is disposed on an inside partitioned by the black matrix BM on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter, which is formed of a resin material that is colored in red, is disposed in association with a red pixel. A blue color filter, which is formed of a resin material that is colored in blue, is disposed in association with a blue pixel. A green color filter, which is formed of a resin material that is colored in green, is disposed in association with a green pixel. Boundaries between these color filters CF are located at positions overlapping the black matrix BM. The color filter CF includes an aperture portion AP1, as will be described later. The aperture portion AP1 penetrates to the inner surface 20A.

The overcoat layer OC covers the color filters CF. In addition, the overcoat layer OC extends over the aperture portion AP1 and covers the inner surface 20A in the aperture portion AP1. The overcoat layer OC reduces the effect of asperities on the surface of the color filters CF. The overcoat layer OC is formed of, for example, a transparent resin material.

The second main common electrodes CA2 and second sub-common electrodes CB2 of the common electrode CE are formed on that side of the overcoat layer OC, which is opposed to the array substrate AR, and each of them is located immediately below the black matrix BM. The second main common electrode CAL2 is located immediately above the first main common electrode CAL1. The second main common electrode CAR2 is located immediately above the first main common electrode CAR1. The second sub-common electrode CBB2 is located immediately above the first sub-common electrode CBB1. The second sub-common electrode CBU2 (not shown) is located immediately above the first sub-common electrode CBU1.

A region between the first main common electrode CAL1, second main common electrode CAL2 and main pixel electrode PA, and a region between the first main common electrode CAR1, second main common electrode CAR2 and main pixel electrode PA, correspond to transmissive regions through which light can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the second main common electrodes CA2 and second sub-common electrodes CB2 of the common electrode CE, and the overcoat layer OC. The second alignment film AL2 is formed of a material which exhibits horizontal alignment properties.

The first alignment film AL1 and second alignment film AL2 are subjected to alignment treatment (e.g. rubbing treatment or optical alignment treatment) for initially aligning the liquid crystal molecules of the liquid crystal layer LQ. A first alignment treatment direction PD1, in which the first alignment film AL1 initially aligns the liquid crystal molecules, is parallel to a second alignment treatment direction PD2, in which the second alignment film AL2 initially aligns the liquid crystal molecules. In an example shown in part (A) of FIG. 3, the first alignment treatment direction PD1 and second alignment treatment direction PD2 are parallel to each other and are identical. In an example shown in part (B) of FIG. 3, the first alignment treatment direction PD1 and second alignment treatment direction PD2 are parallel to each other and are opposite to each other.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ includes liquid crystal molecules LM. The liquid crystal layer LQ is composed of a liquid crystal material having a positive (positive-type) dielectric constant anisotropy.

A first optical element OD1 is attached by, e.g. an adhesive, to an outer surface of the array substrate AR, that is, an outer surface 10B of the first insulative substrate 10 which constitutes the array substrate AR. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis (or first absorption axis) AX1. In the meantime, another optical element, such as a retardation plate, may be disposed between the first polarizer PL1 and the first insulative substrate 10.

A second optical element OD2 is attached by, e.g. an adhesive, to an outer surface of the counter-substrate CT, that is, an outer surface 20B of the second insulative substrate 20 which constitutes the counter-substrate CT. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis (or second absorption axis) AX2. In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a positional relationship of crossed Nicols. In this case, one of the polarizers is disposed such that the polarization axis thereof is substantially parallel or substantially perpendicular to the direction of extension of the main pixel electrode PA or main common electrode CA. Specifically, when the direction of extension of the main pixel electrode PA or main common electrode CA is the second direction Y, the polarization axis of one of the polarizers is parallel to the second direction Y or is parallel to the first direction X. Alternatively, one of the polarizers is disposed such that the polarization axis thereof is parallel or perpendicular to the initial alignment direction of liquid crystal molecules, that is, the first alignment treatment direction PD1 or second alignment treatment direction PD2. When the initial alignment direction is parallel to the second direction Y, the polarization axis of one of the polarizers is parallel to the second direction Y or parallel to the first direction X.

In an example shown in part (a) of FIG. 3, the first polarizer PL1 is disposed such that the first polarization axis AX1 thereof is perpendicular to the initial alignment direction (second direction Y) of liquid crystal molecules LM, and the second polarizer PL2 is disposed such that the second polarization axis AX2 thereof is parallel to the initial alignment direction of liquid crystal molecules LM. In addition, in an example shown in part (b) of FIG. 3, the second polarizer PL2 is disposed such that the second polarization axis AX2 thereof is perpendicular to the initial alignment direction (second direction Y) of liquid crystal molecules LM, and the first polarizer PL1 is disposed such that the first polarization axis AX1 thereof is parallel to the initial alignment direction of liquid crystal molecules LM.

Next, the operation of the liquid crystal display panel LPN having the above-described structure is described with reference to FIG. 2 to FIG. 5.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane.

In this case, each of the first alignment treatment direction PD1 and the second alignment treatment direction PD2 is substantially parallel to the second direction Y. At the OFF time, the liquid crystal molecule LM is initially aligned such that the major axis thereof is substantially parallel to the second direction Y, as indicated by a broken line in FIG. 3. Specifically, the initial alignment direction of the liquid crystal molecule LM is parallel to the second direction Y (or 0° to the second direction Y).

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment). In the state in which the liquid crystal molecules LM are splay-aligned, optical compensation can be made by the liquid crystal molecules LM in the vicinity of the first alignment film AL1 and the liquid crystal molecules LM in the vicinity of the second alignment film AL2, even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved.

In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1 and enters the liquid crystal display panel LPN. The polarization state of the light, which enters the liquid crystal display panel LPN, is linear polarization perpendicular to the first polarization axis AX1 of the first polarizer PL1. The polarization state of such linear polarization hardly varies when the light passes through the liquid crystal display panel LPN at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which a potential difference is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is parallel to the X-Y plane, as indicated by solid lines in the Figure.

In the example shown in FIG. 3, the liquid crystal molecule LM in a region surrounded by the pixel electrode PE, second main common electrode CAL2 and second sub-common electrode CBU2 (i.e. a first transmissive region T1 defined by the pixel electrode PE, gate line G1 and source line S1 in FIG. 2) rotates counterclockwise relative to the second direction Y, and is aligned in a upper left direction in the Figure. The liquid crystal molecule LM in a region surrounded by the pixel electrode PE, second main common electrode CAR2 and second sub-common electrode CBU2 (i.e. a second transmissive region T2 defined by the pixel electrode PE, gate line G1 and source line S2 in FIG. 2) rotates clockwise relative to the second direction Y, and is aligned in an upper right direction in the Figure. The liquid crystal molecule LM in a region surrounded by the pixel electrode PE, second main common electrode CAL2 and second sub-common electrode CBB2 (i.e. a third transmissive region T3 defined by the pixel electrode PE, gate line G2 and source line S1 in FIG. 2) rotates clockwise relative to the second direction Y, and is aligned in a lower left direction in the Figure. The liquid crystal molecule LM in a region surrounded by the pixel electrode PE, second main common electrode CAR2 and second sub-common electrode CBB2 (i.e. a fourth transmissive region T4 defined by the pixel electrode PE, gate line G2 and source line S2 in FIG. 2) rotates counterclockwise relative to the second direction Y, and is aligned in a lower right direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrode PE, and domains are formed in the respective alignment directions. Specifically, a plurality of domains are formed in one pixel PX.

At such ON time, part of backlight, which is incident on the liquid crystal display panel LPN from the backlight 4, passes through the first polarizer PL1, and enters the liquid crystal display panel LPN. The light entering the liquid crystal display panel LPN is linearly polarized light which is perpendicular to the first polarization axis AX1 of the first polarizer PL1. The polarization state of such linearly polarized light varies depending on the alignment state of the liquid crystal molecules LM when the light passes through the liquid crystal layer LQ. For example, when linearly polarized light, which is parallel to the first direction X, has entered the liquid crystal display panel LPN, the light is affected, while passing through the liquid crystal layer LQ, by a retardation of $\lambda/2$ by the liquid crystal molecules which are aligned in a 45°-225° azimuth direction or a 135°-315° azimuth direction relative to the first direction X ($\lambda$ is a wavelength of light passing through the liquid crystal layer LQ). Thereby, the polarization state of the light, which has passed through the liquid crystal layer LQ, becomes linear polarization parallel to the second direction Y. Thus, at the ON time, at least part of the light emerging from the liquid crystal layer LQ passes through the second polarizer PL2 (white display).

According to the structure of the present embodiment, the liquid crystal molecules LM in one pixel are aligned, mainly in four directions. In order to realize such alignment, it should suffice if at least the second main common electrode CAL2 and second main common electrode CAR2 are included as the common electrode CE, in addition to the pixel electrode PE. Specifically, the first main common electrodes CA1 and first sub-common electrodes CB1, which are provided on the array substrate AR, and the second sub-common electrodes CB2, which are provided on the counter-substrate CT, are configured to shield an electric field from other wiring lines, or to make stronger the electric field that is necessary for alignment control of the liquid crystal molecules LM, or to give redundancy to the common electrode CE, and these components are not indispensable for forming the above-described multiple domains.

As regards the above structure, a study is now made of the transmittances of one pixel PX at an OFF time (black display) and at times when gray-scale display is effected.

Figure 6:
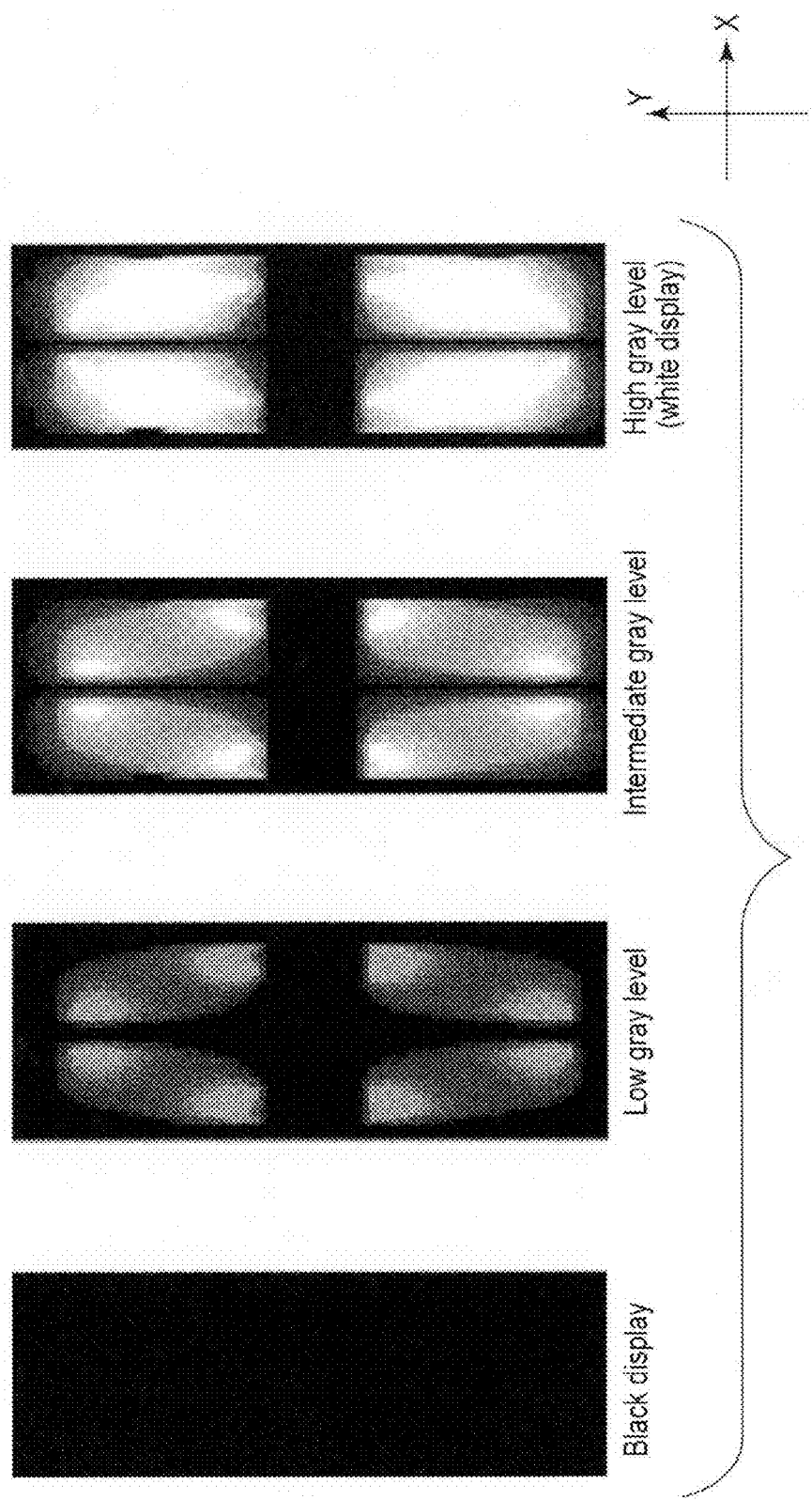
FIG. 6 is a view showing light transmission states at times when black display, low-gray-level display, intermediate-gray-level display and high-gray-level display (white display) were effected in one pixel.

FIG. 6 shows light transmission states at times when black display, low-gray-level display, intermediate-gray-level display and high-gray-level display (white display) were effected.

Long-side silhouettes along the second direction Y of the pixel shown in FIG. 6 are silhouettes of the source lines S, first main common electrodes CA1 and second main common electrodes CA2, or silhouettes of the black matrix BM. Short-side silhouettes along the first direction X of the pixel are silhouettes of the gate lines G, first sub-common electrodes CB1 and second sub-common electrodes CB2, or silhouettes of the black matrix BM. Cross-shaped silhouette intersecting at the center of the pixel are silhouettes of the pixel electrode PE and storage capacitance line C.

At the time of black display, light hardly passes through the entirety of one pixel, and the transmittance becomes substantially zero. At the time of high-gray-level display, light passes through four regions in one pixel, i.e. first to fourth transmissive regions, and the transmittance becomes maximum.

At the time of low-gray-level display and intermediate-gray-level display, like the high-gray-level display, light passes through the first to fourth transmissive regions, but dark areas occur at the central part and corner parts of the pixel. In particular, such dark areas become broader at the time of low-gray-level display. Such dark areas occur because an electric field enough to rotate liquid crystal molecules LM is not applied to the liquid crystal layer LQ and the liquid crystal molecules LM maintain the initial alignment state.

Referring to FIG. 2, the dark areas at the central part of the pixel are formed over the pixel electrode, over the storage capacitance line, over the area where the pixel electrode is opposed to the storage capacitance line, as well as over those parts of the first to fourth transmissive regions, which include cross points between the main pixel electrode PA and sub-pixel electrode PB. In addition, dark areas are formed at corner parts near intersections between the gate lines and source lines. Each dark area has a polygonal shape or an oval shape (including an elliptic shape). For example, dark areas spreading to the first to fourth transmissive regions from the cross points between the main pixel electrode PA and sub-pixel electrode PB and from the corner parts are substantially triangular.

Figure 7:
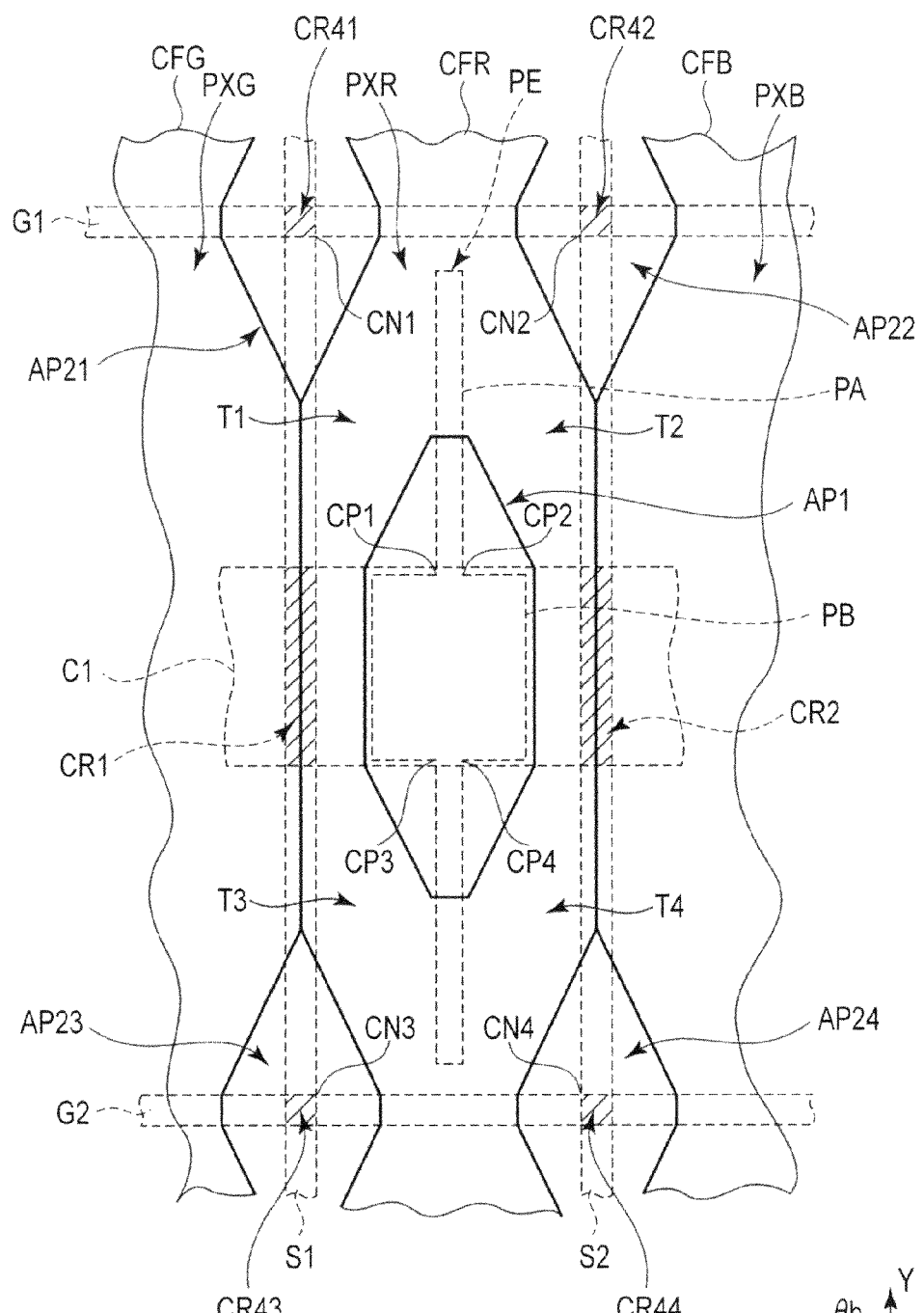
FIG. 7 is a plan view which schematically shows a shape of a color filter in the embodiment.
Figure 7:
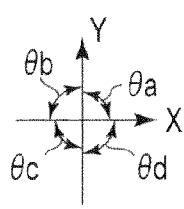

FIG. 7 is a plan view which schematically illustrates the shape of the color filter in the embodiment. In FIG. 7, the pixel electrode PE, gate line G1, gate line G2, source line S1, source line S2 and storage capacitance line C1 are indicated by broken lines. The positions where the gate line G1 and gate line G2, as well as the source line S1 and source line S2, are formed substantially agree with the position where the black matrix is formed.

In the example illustrated, a green pixel PXG, a red pixel PXR and a blue pixel PXB are successively arranged in the first direction X. A green color filter CFG is disposed in the green pixel PXG, a red color filter CFR is disposed in the red pixel PXR, and a blue color filter CFB is disposed in the blue pixel PXB. In the description below, the red color filter CFR of the red pixel PXR is described. Since the green color filter CFG of green pixel PXG and the blue color filter CFB of blue pixel PXB have the same structure as the red color filter CFR, a description thereof is omitted.

Attention is now paid to the first transmissive region T1 which is inside the gate line G1, storage capacitance line C1, source line S1 and pixel electrode PE. In the first transmissive region T1, the red color filter CFR extends from an intersection part CR1 between the source line S1 and storage capacitance line C1 in a direction which is different from the first direction X and second direction Y, i.e. in a direction in a range θa which is greater than 0° and is less than 90°, relative to the first direction X. Specifically, in the case where the first transmissive region T1 is substantially rectangular, the red color filter CFR extends along a diagonal line connecting the intersection part CR1 and a position where the pixel electrode PE and gate line G1 are close to each other.

In other words, in the first transmissive region T1, the red color filter CFR includes an aperture portion AP1 which faces a position opposed to a cross point CP1 between the main pixel electrode PA and sub-pixel electrode PB. Specifically, an edge of the aperture portion AP1 surrounds the position opposed to the cross point CP1. The aperture portion AP1 is formed so as to be opposed to the dark area spreading from the cross point CP1 to the first transmissive region T1, and is opposed to, for example, a triangular area having the cross point CP1 as an apex. In addition, the red color filter CFR includes an aperture portion AP21 which faces a position opposed to a corner part CN1 which is located at a cross part CR41 between the gate line G1 and source line S1. Specifically, an edge of the aperture portion AP21 surrounds the position opposed to the corner part CN1. The opening portion AP21 is formed so as to be opposed to the dark area spreading from the corner part CN1 to the first transmissive region T1, and is opposed to, for example, a triangular area having the corner part CN1 as an apex. In the substantially rectangular first transmissive region T1, the cross point CP1 is located at an opposite angle to the corner part CN1, and the aperture portion AP21 is located at an opposite angle to the aperture portion AP1.

The same applies to the second transmissive region T2 of the red pixel PXR, and the red color filter CFR extends from an intersection part CR2 between the source line S2 and storage capacitance line C1 in a direction in a range θb which is greater than 90° and is less than 180°, relative to the first direction X. In the fourth transmissive region T4 of the red pixel PXR, the red color filter CFR extends from the intersection part CR2 in a direction in a range θc which is greater than 180° and is less than 270°, relative to the first direction X. In the third transmissive region T3 of the red pixel PXR, the red color filter CFR extends from the intersection part CR1 in a direction in a range θd which is greater than 270° and is less than 360°, relative to the first direction X.

The aperture portion AP1 of the red color filter CFR faces the position opposed to the cross points CP2 to CP4. In other words, the edge of the aperture portion AP1 surrounds the position opposed to the cross points CP2 to CP4. Specifically, the aperture portion AP1 is formed so as to be opposed to the dark area spreading from the cross point CP2 to the second transmissive region T2, the dark area spreading from the cross point CP3 to the third transmissive region T3, and the dark area spreading from the cross point CP4 to the fourth transmissive region T4.

Further, the red color filter CFR includes aperture portions AP22 to AP24. The aperture portion AP22 is formed so as to face a position opposed to a corner part CN2 near a cross part CR42 between the gate line G1 and source line S2, and to be opposed to the dark area spreading from the corner part CN2 to the second transmissive region T2. Specifically, an edge of the aperture portion AP22 surrounds the position opposed to the corner part CN2. The aperture portion AP23 is formed so as to face a position opposed to a corner part CN3 near a cross part CR43 between the gate line G2 and source line S1, and to be opposed to the dark area spreading from the corner part CN3 to the third transmissive region T3. Specifically, an edge of the aperture portion AP23 surrounds the position opposed to the corner part CN3. The aperture portion AP24 is formed so as to face a position opposed to a corner part CN4 near a cross part CR44 between the gate line G2 and source line S2, and to be opposed to the dark area spreading from the corner part CN4 to the fourth transmissive region T4. Specifically, an edge of the aperture portion AP24 surrounds the position opposed to the corner part CN4. The aperture portions AP21 to AP24 have substantially the same shape.

Paying attention to one pixel defined by the gate line G1, gate line G2, source line S1 and source line S2, the red color filter CFR includes the aperture portion AP1 formed at the central part of the red pixel PXR and the aperture portions AP21 to AP24 formed at the four corner parts, and the red color filter CFR is formed in a doughnut shape. Like the aperture portion AP1 shown in FIG. 5, the locations where the aperture portions AP21 to AP24 are formed are covered with the overcoat layer OC.

In the example illustrated, the aperture portion AP1 and aperture portions AP21 to AP24 have a polygonal shape (e.g. octagon) elongated in the second direction Y, but the aperture portion AP1 and aperture portions AP21 to AP24 may have an oval shape (or elliptic shape) elongated in the second direction Y. The edges, which define the aperture portion AP1 and aperture portions AP21 to AP24, do not need to be straight, but may be partly curved. Although the aperture portion AP1 is commonly formed at positions opposed to the cross points CP1 to CP4 centering at the sub-pixel electrode PB, the aperture portion AP1 may be formed so as to be separately opposed to the four cross points CP1 to CP4. In this case, the aperture portion AP1 is separated into four aperture portions at the central part of the pixel. However, it is desirable to form, if possible, the common aperture portion, since a stepped portion tends to easy form between the part where the color filter is formed and the part where aperture portion is formed.

The aperture portion AP1 and aperture portions AP21 to AP24 are opposed to the dark areas which occur when low-gray-level display is effected as shown in FIG. 6. Thus, when low-gray-level display is effected, light leakage hardly occurs from the aperture portion AP1 and aperture portions AP21 to AP24, and backlight mainly passes through the color filter. Accordingly, even in the case where the color filter of the present embodiment is applied, when the low-gray-level display is effected, most of backlight in the red pixel PXR passes through the red color filter CFR, most of backlight in the green pixel PXG passes through the green color filter CFG, and most of backlight in the blue pixel PXB passes through the blue color filter CFB. Therefore, degradation in color purity at a time of low-gray-level display can be suppressed. Specifically, when the low-gray-level display is effected, compared to the case where the color filter having no aperture portion is applied, substantially the same range of color reproduction can be maintained.

On the other hand, when high-gray-level display is effected, backlight passes through the color filter and also passes through the aperture portion AP1 and aperture portion AP21 to AP24. The light, which has passed through the aperture portion AP1 and aperture portion AP21 to AP24, is substantially white light. At the time of high-gray-level display, in the red pixel PXR, most of backlight passes through the red color filter CFR, and part of the backlight passes through the aperture portion AP1 and aperture portions AP21 to AP24. Thus, although the color purity of red lowers, the luminance in the red pixel PXR can be improved. Similarly, in the green pixel PXG, most of backlight passes through the green color filter CFG and part of the backlight passes through the aperture portions. Thus, although the color purity of green lowers, the luminance in the green pixel PXG can be improved. Similarly, in the blue pixel PXB, most of backlight passes through the blue color filter CFB and part of the backlight passes through the aperture portions. Thus, although the color purity of blue lowers, the luminance in the blue pixel PXB can be improved.

Figure 8:
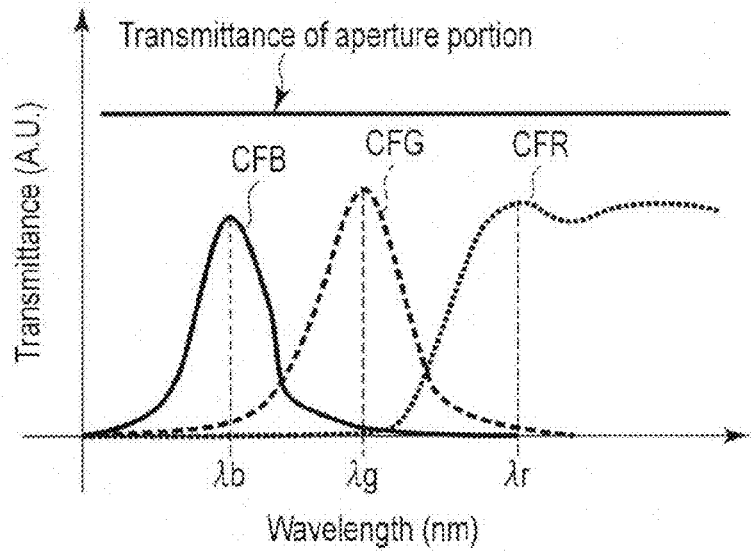
FIG. 8 is a graph showing an example of spectral transmittances of respective color filters and a spectral transmittance at an aperture portion.

FIG. 8 is a graph showing an example of spectral transmittances of the respective color filters and a spectral transmittance at the aperture portion.

The spectral transmittance, which is obtained by the red color filter CFR, is highest in the neighborhood of a red wavelength $\lambda r$ (e.g. 650 nm). The spectral transmittance, which is obtained by the green color filter CFG, is highest in the neighborhood of a green wavelength $\lambda g$ (e.g. 550 nm). The spectral transmittance, which is obtained by the blue color filter CFB, is highest in the neighborhood of a blue wavelength $\lambda b$ (e.g. 450 nm). The spectral transmittance, which is obtained at the aperture portion AP1 and aperture portions AP21 to AP24, corresponds to the spectral transmittance of white light.

In the red pixel PXR, when low-gray-level display is effected, a color corresponding to the spectral transmittance obtained by the red color filter CFR is displayed, and when high-gray-level display is effected, a color in which the spectral transmittance of white light is added to the spectral transmittance obtained by the red color filter CFR is displayed. Similarly, in the green pixel PXG, when low-gray-level display is effected, a color corresponding to the spectral transmittance obtained by the green color filter CFG is displayed, and when high-gray-level display is effected, a color in which the spectral transmittance of white light is added to the spectral transmittance obtained by the green color filter CFG is displayed. Similarly, in the blue pixel PXB, when low-gray-level display is effected, a color corresponding to the spectral transmittance obtained by the blue color filter CFB is displayed, and when high-gray-level display is effected, a color in which the spectral transmittance of white light is added to the spectral transmittance obtained by the blue color filter CFB is displayed.

Figure 9:
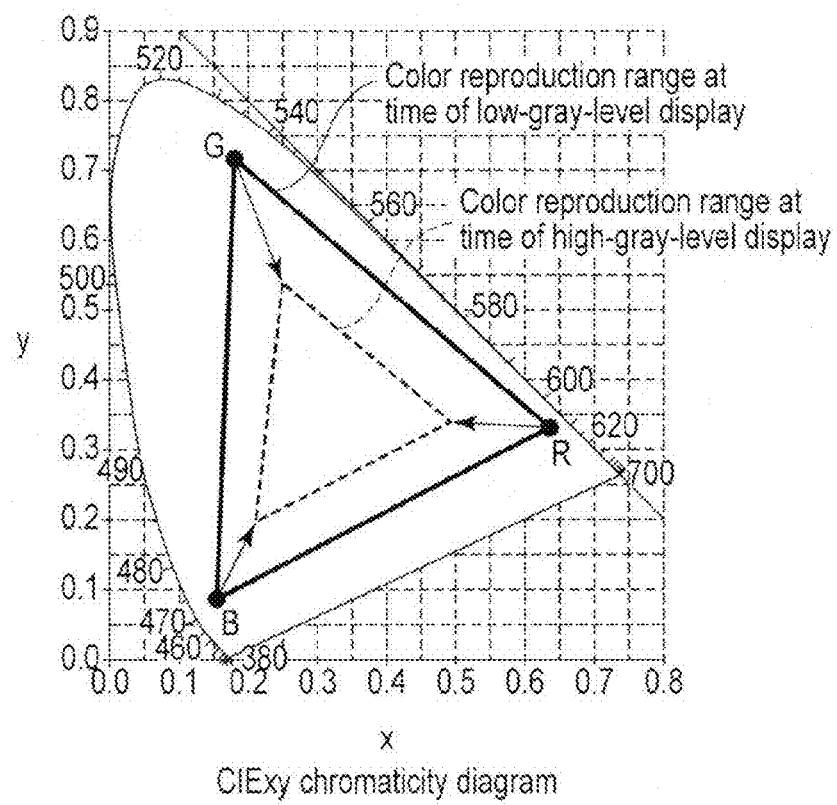
FIG. 9 is a chromaticity diagram showing an example of a color reproduction range at a time of low-gray-level display and a color reproduction range at a time of high-gray-level display in a case where the color filters of the embodiment are applied.

FIG. 9 is a chromaticity diagram showing an example of a color reproduction range at a time of low-gray-level display and a color reproduction range at a time of high-gray-level display in a case where the color filters of the embodiment are applied. FIG. 9 shows color reproduction ranges by a CIExy chromaticity diagram.

At a time of low-gray-level display, since the color corresponding to the spectral transmittance of the red color filter CFR is displayed in the red pixel PXR, a red color with high color purity is displayed. Similarly, a green color with high color purity is displayed in the green pixel PXG, and a blue color with high color purity is displayed in the blue pixel PXB. Thus, when low-gray-level display is effected, a relatively wide color reproduction range can be obtained.

When high-gray-level display is effected, the color in which the spectral transmittance of white light is added to the spectral transmittance obtained by the red color filter CFR is displayed in the red pixel PXR. Specifically, when high-gray-level display is effected, the chromaticity coordinates shift to the white side, compared to the color corresponding to the spectral transmittance of the red color filter CFR as in the case of the low-gray-level display. Accordingly, at the time of high-gray-level display, the color purity of red becomes lower than in the case of the low-gray-level display. Similarly, the chromaticity coordinates of green at the time of high-gray-level display in the green pixel PXG shift to the white side, compared to the case of low-gray-level display, and the chromaticity coordinates of blue at the time of high-gray-level display in the blue pixel PXB shift to the white side, compared to the case of low-gray-level display. Accordingly, at the time of high-gray-level display, compared to low-gray-level display, the color reproduction range becomes narrower. Meanwhile, at the time of high-gray-level display, white light, which passes through the aperture portions of the color filter in each pixel, contributes to display. Therefore, in each of the red pixel PXR, green pixel PXG and blue pixel PXB, a high brightness can be obtained at the time of high-gray-level display, compared to the case where the color filter having no aperture portion is applied.

According to the present embodiment, when low-gray-level display is effected, no light leakage occurs and a wide color reproduction range can be obtained. When high-gray-level display is effected, a high brightness can be obtained. Therefore, the display quality can be improved.

According to the present embodiment, a high transmittance can be obtained in the inter-electrode gap between the pixel electrode PE and the common electrode CE. Thus, a transmittance per pixel can sufficiently be increased by increasing the inter-electrode distance between the pixel electrode PE and the main common electrode CA. As regards product specifications in which the pixel pitch is different, the peak condition of the transmittance distribution can be used by varying the inter-electrode distance (e.g. by varying the position of disposition of the main common electrode CA in relation to the main pixel electrode PA). Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch. Therefore, requirements for high transmittance and high resolution can easily be realized.

According to the present embodiment, the transmittance is sufficiently lowered in the region overlapping the black matrix BM. The reason for this is that the electric field does not leak to the outside of the pixel from the position of the common electrode CE, and an undesired lateral electric field does not occur between pixels which neighbor each other with the black matrix BM interposed, and therefore the liquid crystal molecules LM in the region overlapping the black matrix BM keep the initial alignment state, like the case of the OFF time (or black display time). Accordingly, even when the colors of the color filters CF are different between neighboring pixels, the occurrence of color mixture can be suppressed, and the decrease in color reproducibility or the decrease in contrast ratio can be suppressed.

When misalignment occurs between the array substrate AR and the counter-substrate CT, there are cases in which a difference occurs in the inter-electrode distance between the pixel electrode PE and the common electrodes CE on both sides of the pixel electrode PE. However, since such misalignment commonly occurs in all pixels PX, the electric field distribution does not differ between the pixels PX, and the influence on the display of images is very small. In addition, even when misalignment occurs between the array substrate AR and the counter-substrate CT, leakage of an undesired electric field to the neighboring pixel can be suppressed. Thus, even when the colors of the color filters CF differ between neighboring pixels, the occurrence of color mixture can be suppressed, and the decrease in color reproducibility or the decrease in contrast ratio can be suppressed.

According to the present embodiment, the main common electrodes CA are opposed to the source lines S. In particular, in the case where the main common electrode CAL and main common electrode CAR are disposed above the source line S1 and source line S2, compared to the case where the main common electrode CAL and main common electrode CAR are disposed on the pixel electrode PE side of the source line S1 and source line S2, the transmissive region can be enlarged and the transmittance of the pixel PX can be enhanced. In addition, by disposing the main common electrode CAL and main common electrode CAR above the source line S1 and source line S2, the inter-electrode distance between the pixel electrode PE, on the one hand, and the main common electrode CAL and main common electrode CAR, on the other hand, can be increased, and a lateral electric field, which is closer to a horizontal lateral electric field, can be produced. Therefore, a wide viewing angle, which is the advantage of an IPS mode, etc. in the conventional structure, can be maintained.

According to the present embodiment, a plurality of domains can be formed in one pixel. Thus, the viewing angle can optically be compensated in plural directions, and a wide viewing angle can be realized.

According to the present embodiment, the array substrate AR includes the first main common electrodes CA1 which are located on both sides of the pixel electrode PE. Since the first main common electrodes CA1 are broken at positions neighboring the sub-pixel electrode PB, even if the width in the first direction X of the sub-pixel electrode PB increases or the width in the first direction X of the pixel PX decreases, it is possible to sufficiently secure a horizontal inter-electrode distance between the sub-pixel electrode PB having a pixel potential and the first main common electrode CA1 having a common potential. Therefore, it is possible to suppress the occurrence of a display defect due to short-circuit between the pixel electrode PE and the common electrode CE. In addition, it is possible to adapt to a narrow pixel pitch in a case where the pixel pitch in the first direction X is decreased, and microfabrication with higher fineness can be achieved.

Furthermore, since the first main common electrode CA1 is opposed to the source line S, an undesired electric field from the source line S can be shielded. It is thus possible to suppress application of an undesired bias from the source line S to the liquid crystal layer LQ, and to suppress the occurrence of a display defect such as crosstalk (e.g. a phenomenon that when a pixel potential for displaying white is supplied to the source line that is connected to the pixel PX in the state in which the pixel PX is set at a pixel potential for displaying black, light leaks from a part of the pixel PX and the brightness increases).

Since the first sub-common electrode CB1 is opposed to the gate line G, an undesired electric field from the gate line G can be shielded. It is thus possible to suppress application of an undesired bias from the gate line G to the liquid crystal layer LQ, and to suppress the occurrence of a display defect such as burn-in, and the occurrence of light leakage due to an alignment defect of liquid crystal molecules.

Since the first main common electrodes CA1 and first sub-common electrodes CB1 are electrically connected and formed in a substantially grid-like shape, redundancy can be improved. In addition, since the second main common electrodes CA2 and second sub-common electrodes CB2 are electrically connected and formed in a substantially grid-like shape, redundancy can be improved. Accordingly, even if breakage occurs in a part of the common electrode CE that is provided on the array substrate AR or breakage occurs in a part of the common electrode CE that is provided on the counter-substrate CT, the common potential can stably be supplied to each pixel PX, and the occurrence of a display defect can be suppressed.

The above-described example is directed to the case where the initial alignment direction of liquid crystal molecules LM is parallel to the second direction Y. However, the initial alignment direction of liquid crystal molecules LM may be an oblique direction D which obliquely crosses the second direction Y, as shown in FIG. 3. An angle θ1 formed between the second direction Y and the initial alignment direction D is 0° or more and 45° or less. From the standpoint of alignment control of liquid crystal molecules LM, it is very effective that the angle θ1 is about 5° to 30°, more preferably 20° or less. Specifically, it is desirable that the initial alignment direction of liquid crystal molecules LM be substantially parallel to a direction in a range of 0° or more and 20° or less, relative to the second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy. Although a detailed description is omitted, in the case of the negative-type liquid crystal material, since the positive/negative state of dielectric constant anisotropy is reversed, it is desirable that the above-described formed angle θ1 be within the range of 45° to 90°, preferably the range of 70° or more and 90° or less.

Since a lateral electric field is hardly produced over the pixel electrode PE or common electrode CE even at the ON time (or an electric field enough to drive liquid crystal molecules LM is not produced), the liquid crystal molecules LM scarcely move from the initial alignment direction, like the case of the OFF time. Thus, even if the pixel electrode PE and common electrode CE are formed of a light-transmissive, electrically conductive material such as ITO, little backlight passes through these regions, and these regions hardly contribute to display at the ON time. Thus, the pixel electrode PE and common electrode CE do not necessarily need to be formed of a transparent, electrically conductive material, and may be formed of an opaque wiring material such as aluminum (Al), titanium (Ti), silver (Ag), molybdenum (Mo), or tungsten (W).

Next, other structures of the embodiment are described.

FIG. 10 is a plan view which schematically illustrates another shape of the color filter in the embodiment. In the illustrated structure example, the storage capacitance line C1 is located with such a bias as to be closer to the gate line G2 than to the gate line G1. Specifically, the distance in the second direction Y between the storage capacitance line C1 and the gate line G2 is less than the distance in the second direction Y between the storage capacitance line C1 and the gate line G1. In this structure example, compared to the structure example shown in FIG. 7, the positions of aperture portions, which are formed in the color filter, are different. In the other respects, this structure example is the same as the structure example shown in FIG. 7, and the same parts are denoted by like reference numerals and a detailed description thereof is omitted.

In the description below, the structure of the red pixel PXR, in which the red color filter CFR is disposed, is described. Since the green pixel PXG and blue pixel PXB have the same structure, a description thereof is omitted.

In the red pixel PXR which is defined by the gate line G1, gate line G2, source line S1 and source line S2, the pixel electrode PE includes a sub-pixel electrode PB, which is opposed to the storage capacitance line C1, and a strip-shaped main pixel electrode PA, which linearly extends from the sub-pixel electrode PB toward the gate line G1, and the pixel electrode PE is formed in a T shape.

Attention is now paid to the first transmissive region (the left-side region of the red pixel PXR) T1 which is inside the gate line G1, storage capacitance line C1, source line S1 and pixel electrode PE. In the first transmissive region T1, the red color filter CFR extends from the intersection part CR1 in a direction in a range θa which is greater than 0° and is less than 90°, relative to the first direction X. Specifically, in the first transmissive region T1 that is substantially rectangular, the red color filter CFR extends along a diagonal line connecting the intersection part CR1 and a position where the main pixel electrode PA and gate line G1 are close to each other.

In other words, in the first transmissive region T1, the red color filter CFR includes an aperture portion AP1 which faces a position opposed to a cross point CP1 between the main pixel electrode PA and sub-pixel electrode PB. Specifically, an edge of the aperture portion AP1 surrounds the position opposed to the cross point CP1. The aperture portion AP1 is formed so as to be opposed to the dark area spreading from the cross point CP1 to the first transmissive region T1. For example, the aperture portion AP1 is opposed to a triangular area having the cross point CP1 as an apex. In addition, the red color filter CFR includes an aperture portion AP21 which faces a position opposed to a corner part CN1 which is located at a cross part CR41 between the gate line G1 and source line S1. Specifically, an edge of the aperture portion AP21 surrounds the position opposed to the corner part CN1. The opening portion AP21 is formed so as to be opposed to the dark area spreading from the corner part CN1 to the first transmissive region T1, and is opposed to, for example, a triangular area having the corner part CN1 as an apex. In the substantially rectangular first transmissive region T1, the cross point CP1 is located at an opposite angle to the corner part CN1, and the aperture portion AP21 is located at an opposite angle to the aperture portion AP1.

In the second transmissive region (the right-side region of the red pixel PXR) T2 which is inside the gate line G1, storage capacitance line C1, source line S2 and pixel electrode PE, the red color filter CFR extends from the intersection part CR2 in a direction in a range θb which is greater than 90° and is less than 180°, relative to the first direction X. The aperture portion AP1 is formed so as to be opposed to the dark area spreading from the cross point CP2 to the second transmissive region T2. Further, the red color filter CFR includes an aperture portion AP22 which faces a position opposed to a corner part CN2 located at a cross part CR42 between the gate line G1 and source line S2. Specifically, an edge of the aperture portion AP22 surrounds the position opposed to the corner part CN2. The aperture portion AP22 is formed so as to be opposed to the dark area spreading from the corner part CN2 to the second transmissive region T2. In the substantially rectangular second transmissive region T2, the cross point CP2 is located at an opposite angle to the corner part CN2, and the aperture portion AP22 is located at an opposite angle to the aperture portion AP1. The aperture portion AP21 and aperture portion AP22 have substantially the same shape. Although the shapes of the aperture portion AP1 and aperture portions AP21 and AP22 are polygonal in the illustrated example, the shapes are not limited to this example.

Paying attention to one pixel defined by the gate line G1, gate line G2, source line S1 and source line S2, the red color filter CFR includes the aperture portion AP1 formed on the gate line G2 side of the central part of the red pixel PXR, and the aperture portion AP21 and aperture portion AP22 formed at the two corner parts, and the red color filter CFR is formed in a U shape.

Like the structure example illustrated in FIG. 7, the aperture portion AP1 and the aperture portions AP21 and AP22 are formed at positions corresponding to dark areas which occur when low-gray-level display is effected. Therefore, in this structure example, too, when low-gray-level display is effected, light leakage hardly occurs from the aperture portion AP1 and aperture portions AP21 and AP22, and a wide color reproduction range can be obtained. In addition, when high-gray-level display is effected, a high brightness can be obtained.

FIG. 11 is a plan view which schematically illustrates another shape of the color filter in the embodiment. In the illustrated structure example, like the structure example shown in FIG. 10, the storage capacitance line C1 is located with such a bias as to be closer to the gate line G2 than to the gate line G1. In this structure example, compared to the structure example shown in FIG. 7, the shape of the pixel electrode and the positions of aperture portions, which are formed in the color filter, are different.

In the red pixel PXR which is defined by the gate line G1, gate line G2, source line S1 and source line S2, the pixel electrode PE includes a main pixel electrode PA, a sub-pixel electrode PB1, which is continuous with one end side of the main pixel electrode PA and is opposed to the storage capacitance line C1, and a sub-pixel electrode PB2 which is continuous with the other end side of the main pixel electrode PA, and the pixel electrode PE is formed in an I shape.

In the first transmissive region T1 which is inside the gate line G1, storage capacitance line C1, source line S1 and pixel electrode PE, the red color filter CFR includes an aperture portion AP1 which faces a position opposed to a cross point CP1 between the main pixel electrode PA and sub-pixel electrode PB1, and an aperture portion AP2 which faces a position opposed to a cross point CP2 between the main pixel electrode PA and sub-pixel electrode PB2. The aperture portion AP1 is formed so as to be opposed to the dark area spreading from the cross point CP1 to the first transmissive region T1. The aperture portion AP2 is formed so as to be opposed to the dark area spreading from the cross point CP2 to the first transmissive region T1.

In the second transmissive region T2 which is inside the gate line G1, storage capacitance line C1, source line S2 and pixel electrode PE, the aperture portion AP1 of the red color filter CFR faces a position opposed to a cross point CP3 between the main pixel electrode PA and the sub-pixel electrode PB1, and the aperture portion AP2 faces a position opposed to a cross point CP4 between the main pixel electrode PA and the sub-pixel electrode PB2.

Like the structure example illustrated in FIG. 7, the aperture portion AP1 and the aperture portion AP2 are formed at positions corresponding to dark areas which occur when low-gray-level display is effected. Therefore, in this structure example, too, when low-gray-level display is effected, light leakage hardly occurs from the aperture portion AP1 and aperture portion AP2, and a wide color reproduction range can be obtained. In addition, when high-gray-level display is effected, a high brightness can be obtained.

In the above-described three structure examples, for example, the part, at which the main pixel electrode PA and sub-pixel electrode PB intersect, is a part where liquid crystal molecules less easily respond to an electric field than in other parts in one pixel. Thus, the part, at which the main pixel electrode PA and sub-pixel electrode PB intersect, is a part where the brightness is lower than in the other parts. However, the brightness in a gray scale from a low gray level to a high gray level can be improved by disposing a transparent or colorless material, in place of the color filter, in that part where liquid crystal molecules less easily respond to an electric field, as in each of the above-described structure examples.

In the present embodiment, the structure of the pixel PX is not limited to the above-described example.

In the above-described example, the structure, in which the storage capacitance line is disposed immediately below the sub-pixel electrode PB, has been described. However, the gate line may be disposed immediately below the sub-pixel electrode PB. In addition, in the above-described example, the case has been described that the direction of extension of the main pixel electrode PA is the second direction Y. However, the main pixel electrode PA may extend in the first direction X. In this case, the direction of extension of the main common electrode CA is the first direction X. Besides, in the above-described example, the case has been described that the common electrode CE including the main common electrodes CA, which are located on both sides of the main pixel electrode, are provided in association with the pixel electrode PE including the main pixel electrode PA. However, the pixel electrode PE including main pixel electrodes PA, which are located on both sides of the main common electrode, may be provided in association with the common electrode CE including the main common electrode CA.

As has been described above, according to the present embodiments, a liquid crystal display device which can suppress degradation in display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a first gate line and a second gate line which extend in a first direction, a storage capacitance line which extends in the first direction between the first gate line and the second gate line, a first source line and a second source line which extend in a second direction crossing the first direction, a switching element which is electrically connected to the first gate line and the first source line, a main pixel electrode which extends in the second direction between the first source line and the second source line, a sub-pixel electrode which extends in the first direction, is electrically connected to the switching element, crosses the main pixel electrode and is continuous with the main pixel electrode, main common electrodes which extend in the second direction on both sides of the main pixel electrode, and a first alignment film which covers the main pixel electrode and the sub-pixel electrode;
a second substrate including a color filter which includes a first aperture portion defined by a first edge surrounding a position opposed to cross points between the main pixel electrode and the sub-pixel electrode, and an overcoat layer which covers the color filter and extends over the first aperture portion; and
a liquid crystal layer including liquid crystal molecules held between the first substrate and the second substrate.

2. The liquid crystal display device of claim 1, wherein the color filter extends in a direction, which is different from the first direction and the second direction, from a first intersection part between the first source line and the storage capacitance line and from a second intersection part between the second source line and the storage capacitance line.

3. The liquid crystal display device of claim 2, wherein the color filter extends along a diagonal line from the first intersection part in a first transmissive region having a substantially rectangular shape defined by the main pixel electrode, the sub-pixel electrode, the first gate line and the first source line, and extends along a diagonal line from the second intersection part in a second transmissive region having a substantially rectangular shape defined by the main pixel electrode, the sub-pixel electrode, the first gate line and the second source line.

4. The liquid crystal display device of claim 3, wherein the cross points opposed to the first aperture portion include a first cross point located at an opposite angle to a first corner part which is located at a position where the first gate line and the first source line intersect in the first transmissive region, and a second cross point located at an opposite angle to a second corner part which is located at a position where the first gate line and the second source line intersect in the second transmissive region.

5. The liquid crystal display device of claim 4, wherein the first aperture portion is opposed to a first area spreading from the first cross point to the first transmissive region, and a second area spreading from the second cross point to the second transmissive region.

6. The liquid crystal display device of claim 5, wherein the first area has a triangular shape having the first cross point as an apex, and the second area has a triangular shape having the second cross point as an apex.

7. The liquid crystal display device of claim 6, wherein the color filter further includes a second aperture portion defined by a second edge that surrounds a position opposed to the first corner park, and a third aperture portion defined by a third edge that surrounds a position opposed to the second corner part.

8. The liquid crystal display device of claim 7, wherein the second aperture portion is opposed to a third area spreading from the first corner part to the first transmissive region, and the third aperture portion is opposed to a fourth area spreading from the second corner part to the second transmissive region.

9. The liquid crystal display device of claim 8, wherein the third area has a triangular shape having the first corner part as an apex, and the fourth area has a triangular shape having the second corner park as an apex.

10. The liquid crystal display device of claim 1, wherein the storage capacitance line is located at a substantially middle point between the first gate line and the second gate line, and
the sub-pixel electrode is formed at a position opposed to the storage capacitance line.

11. The liquid crystal display device of claim 10, wherein the first aperture portion is formed at a central part of a pixel which is defined by the first gate line, the second gate line, the first source line and the second source line.

12. The liquid crystal display device of claim 11, wherein the color filter is formed in a doughnut shape in the pixel.

13. The liquid crystal display device of claim 1, wherein the storage capacitance line is located to be closer to the second gate line than to the first gate line, and
the sub-pixel electrode is formed at a position opposed to the storage capacitance line.

14. The liquid crystal display device of claim 13, wherein the first aperture portion is formed on the second gate line side of a central part of a pixel which is defined by the first gate line, the second gate line, the first source line and the second source line.

15. The liquid crystal display device of claim 14, wherein the color filter is formed in a U shape in the pixel.

16. The liquid crystal display device of claim 1, wherein in a state in which an electric field is not produced between the main pixel electrode and the main common electrode, an initial alignment direction of the liquid crystal molecules is substantially parallel to the second direction, and the liquid crystal molecules are splay-aligned or homogeneously aligned between the first substrate and the second substrate.

17. The liquid crystal display device of claim 16, further comprising a first polarizer which is disposed on an outer surface of the first substrate and includes a first polarization axis, and a second polarizer which is disposed on an outer surface of the second substrate and includes a second polarization axis having a positional relationship of crossed Nicols with the first polarization axis, the first polarization axis being perpendicular or parallel to the initial alignment direction.

18. A liquid crystal display device comprising:
a first substrate including a first gate line and a second gate line which extend in a first direction, a storage capacitance line which extends in the first direction at a substantially middle point between the first gate line and the second gate line, a first source line and a second source line which extend in a second direction crossing the first direction, a switching element which is electrically connected to the first gate line and the first source line, a cross-shaped pixel electrode including a main pixel electrode, which extends in the second direction between the first source line and the second source line, and a sub-pixel electrode, which is located above the storage capacitance line, is electrically connected to the switching element, crosses the main pixel electrode and extends in the first direction, main common electrodes which extend in the second direction on both sides of the main pixel electrode, and a first alignment film which covers the pixel electrode;
a second substrate including a color filter which includes a first aperture portion defined by a first edge surrounding a position opposed to first to fourth cross points between the main pixel electrode and the sub-pixel electrode at a central part of the pixel, and an overcoat layer which covers the color filter and extends over the first aperture portion; and
a liquid crystal layer including liquid crystal molecules held between the first substrate and the second substrate.

19. The liquid crystal display device of claim 18, wherein the color filter further includes a second aperture portion defined by a second edge surrounding a position opposed to a first corner part which is located at a position where the first gate line and the first source line intersect, a third aperture portion defined by a third edge surrounding a position opposed to a second corner part which is located at a position where the first gate line and the second source line intersect, a fourth aperture portion defined by a fourth edge surrounding a position opposed to a third corner part which is located at a position where the second gate line and the first source line intersect, and a fifth aperture portion defined by a fifth edge surrounding a position opposed to a fourth corner part which is located at a position where the second gate line and the second source line intersect.

20. The liquid crystal display device of claim 19, wherein the second to fifth aperture portions have a same shape.

* * * * *